Figure 1:
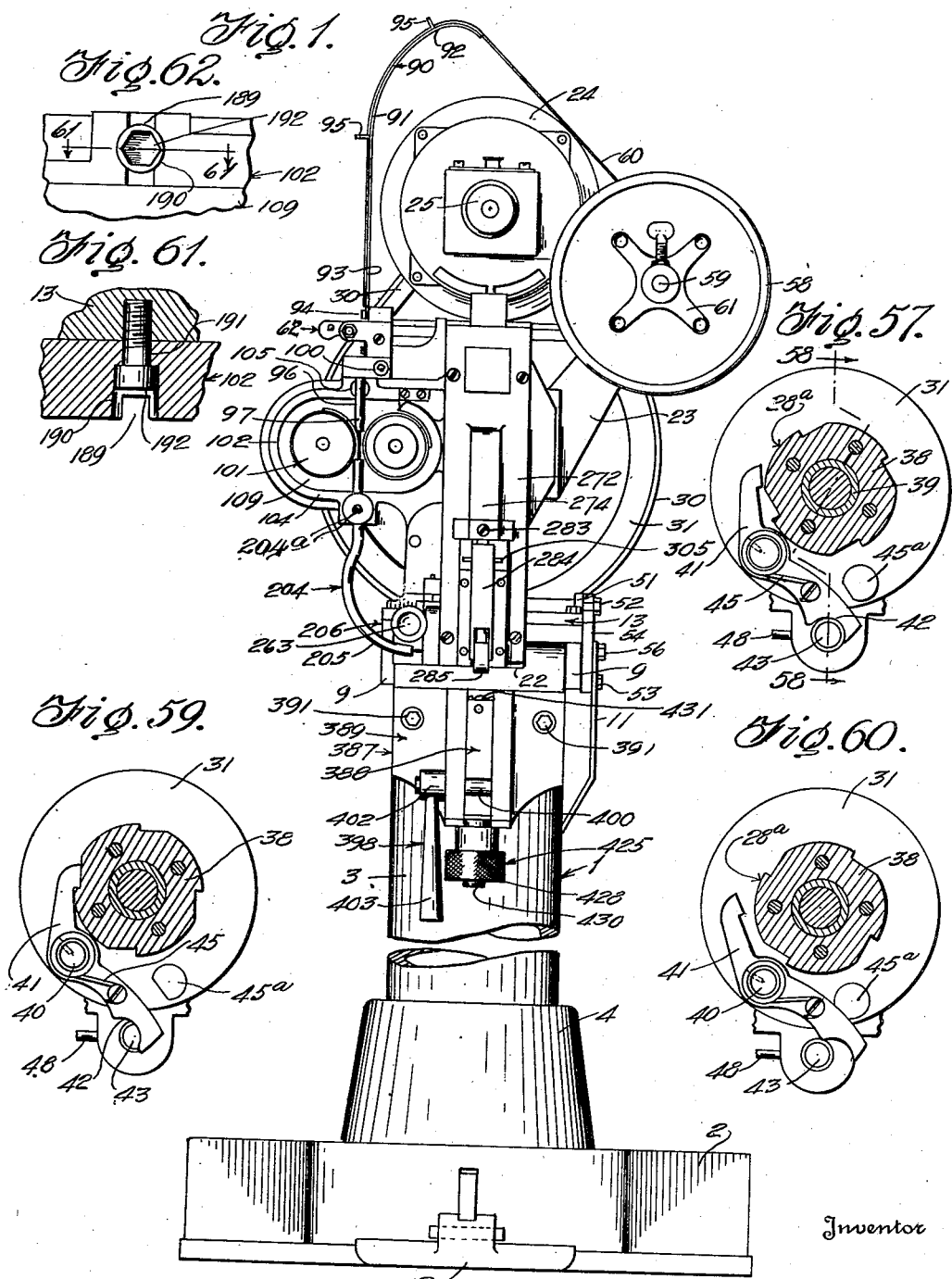

Nov. 7, 1939.  A. F. FISCHER  2,179,036
COMBINED STAPLE FORMING AND DRIVING MACHINE
Filed April 2, 1938  13 Sheets-Sheet 1

Inventor
ARNOLD F. FISCHER,
By Kimmel & Crowell,
Attorneys

Nov. 7, 1939.　　　　A. F. FISCHER　　　　2,179,036
COMBINED STAPLE FORMING AND DRIVING MACHINE
Filed April 2, 1938　　　13 Sheets-Sheet 2

Inventor
ARNOLD F. FISCHER,
By Kimmel & Crowell,
Attorneys

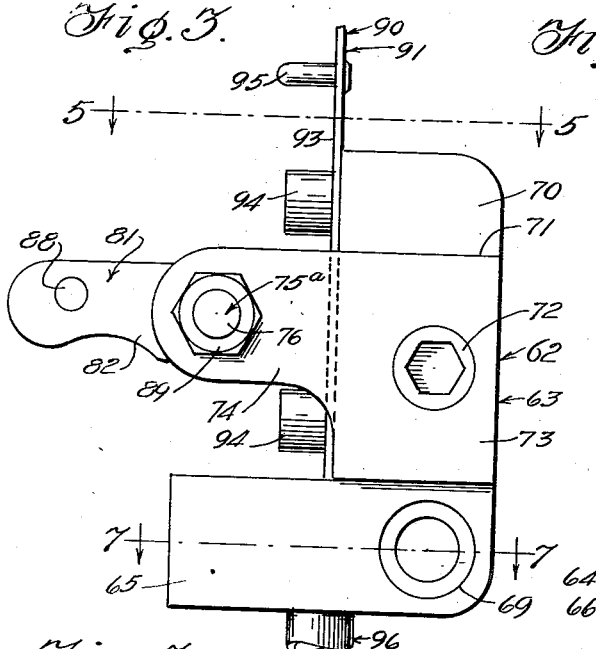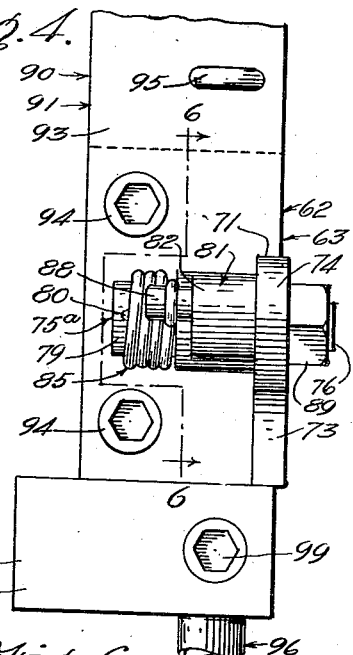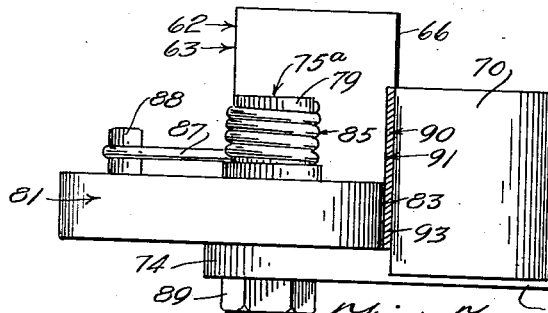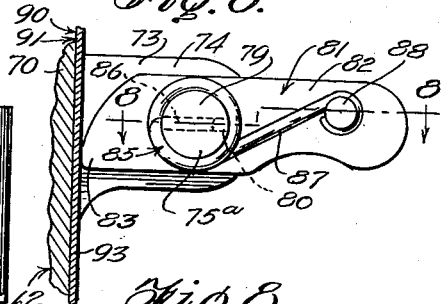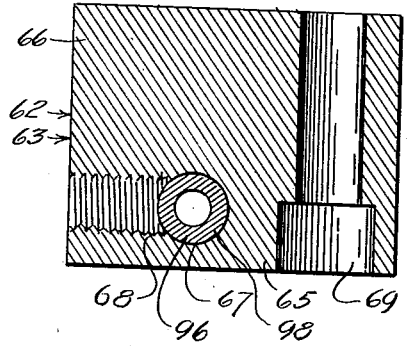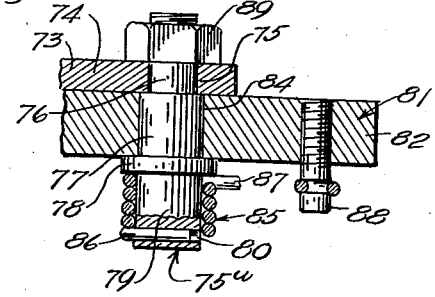

Nov. 7, 1939.  A. F. FISCHER  2,179,036
COMBINED STAPLE FORMING AND DRIVING MACHINE
Filed April 2, 1938    13 Sheets-Sheet 4
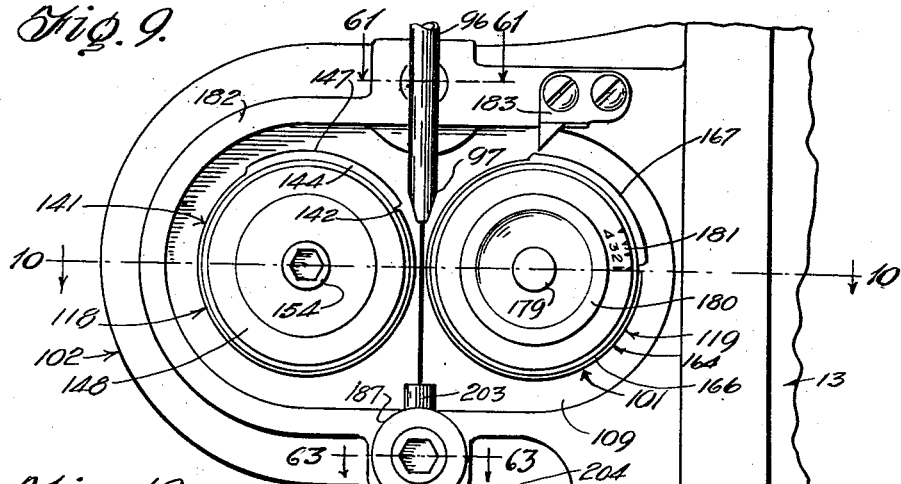
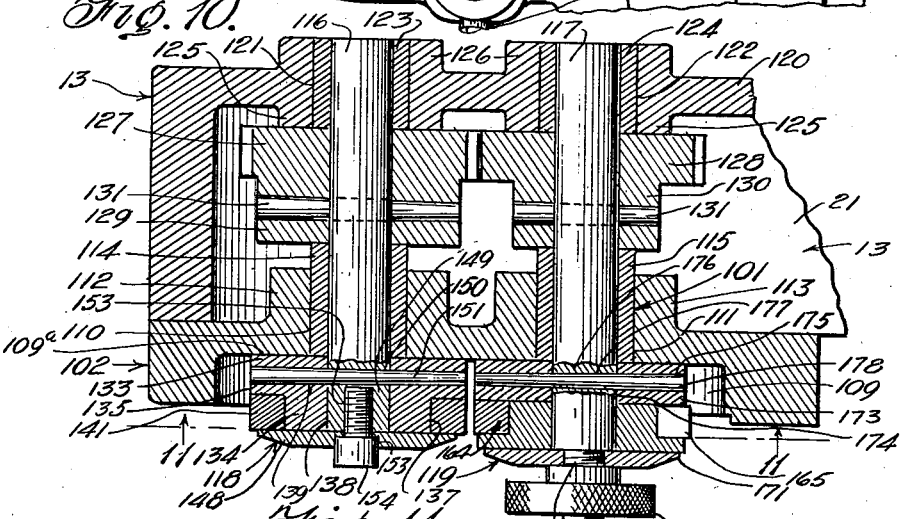
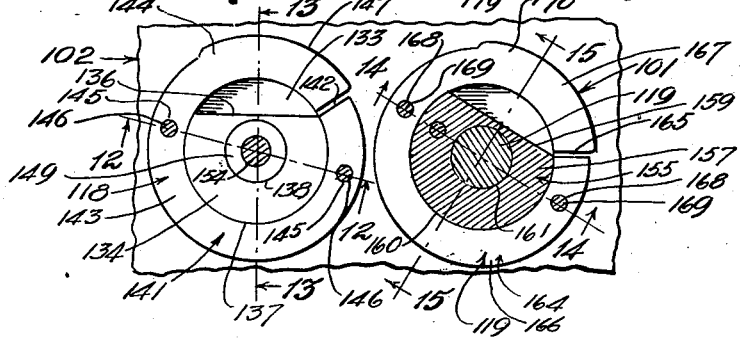
Inventor
ARNOLD F. FISCHER,
By Kimmel & Crowell,
Attorneys

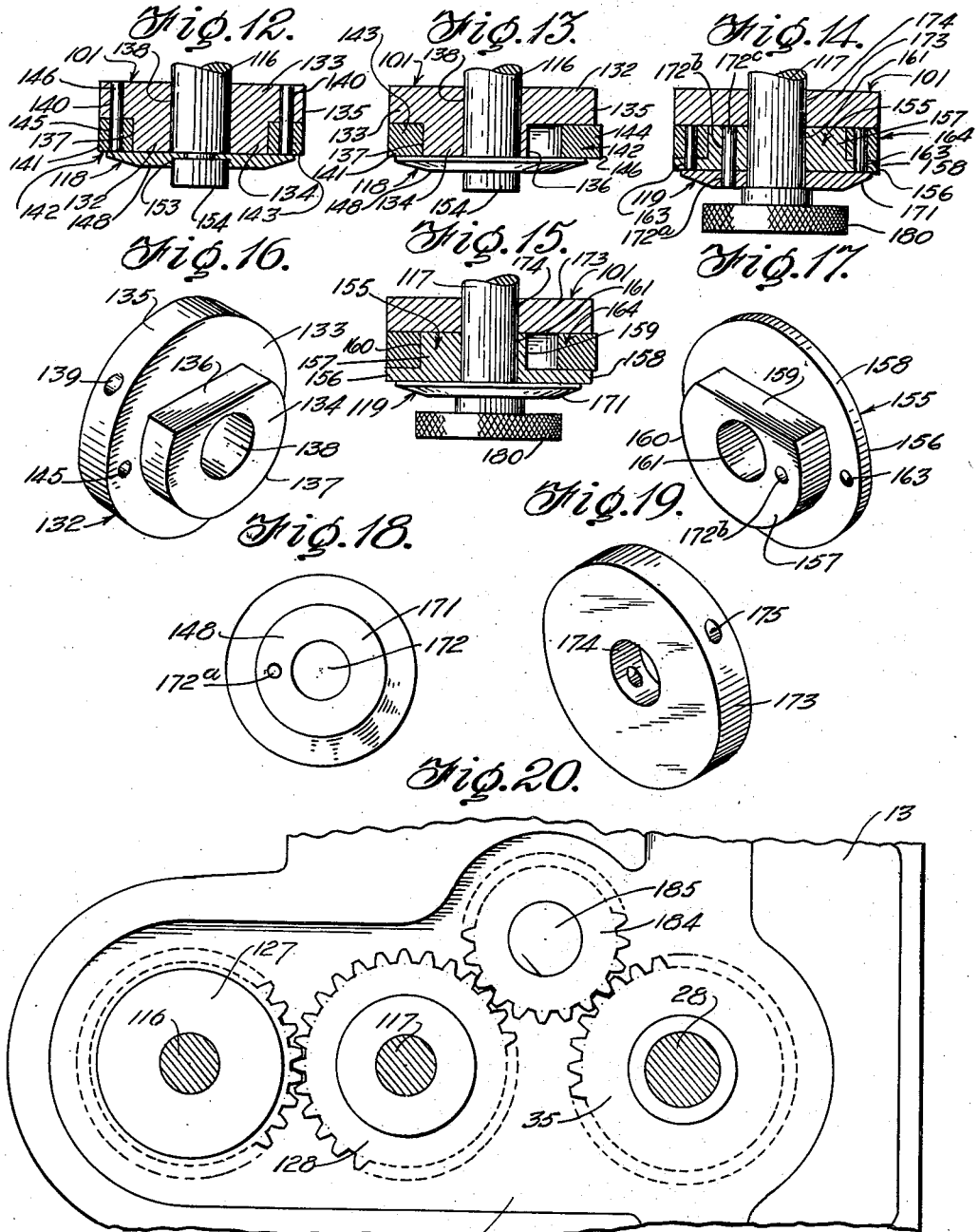

Nov. 7, 1939.     A. F. FISCHER     2,179,036
COMBINED STAPLE FORMING AND DRIVING MACHINE
Filed April 2, 1938     13 Sheets-Sheet 6
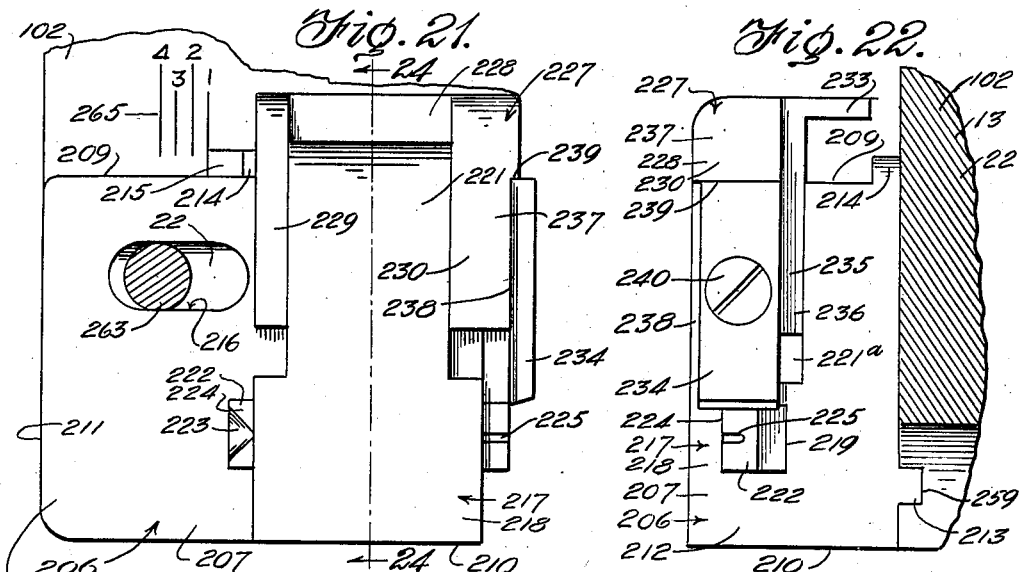
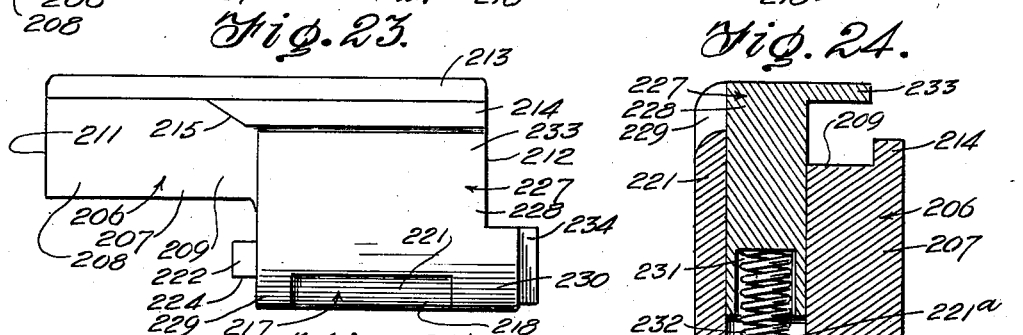
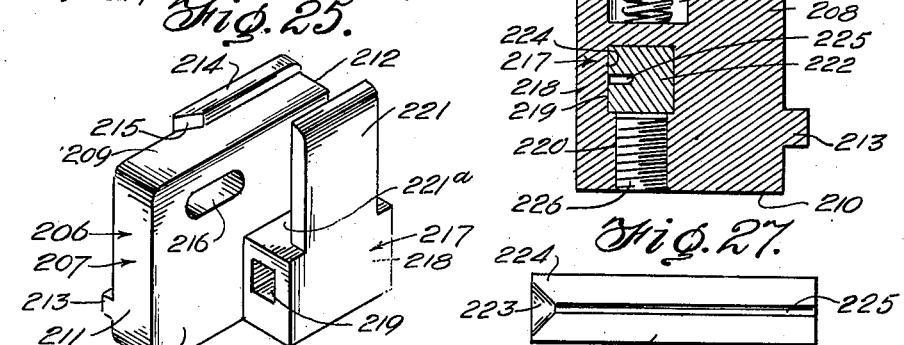
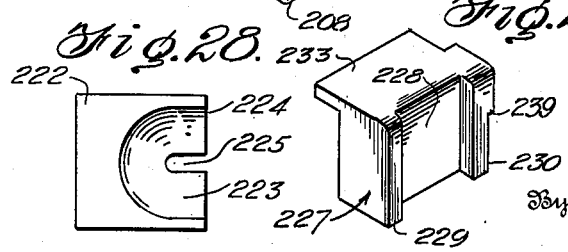
Inventor
ARNOLD F. FISCHER,
By Kimmel & Crowell
Attorneys

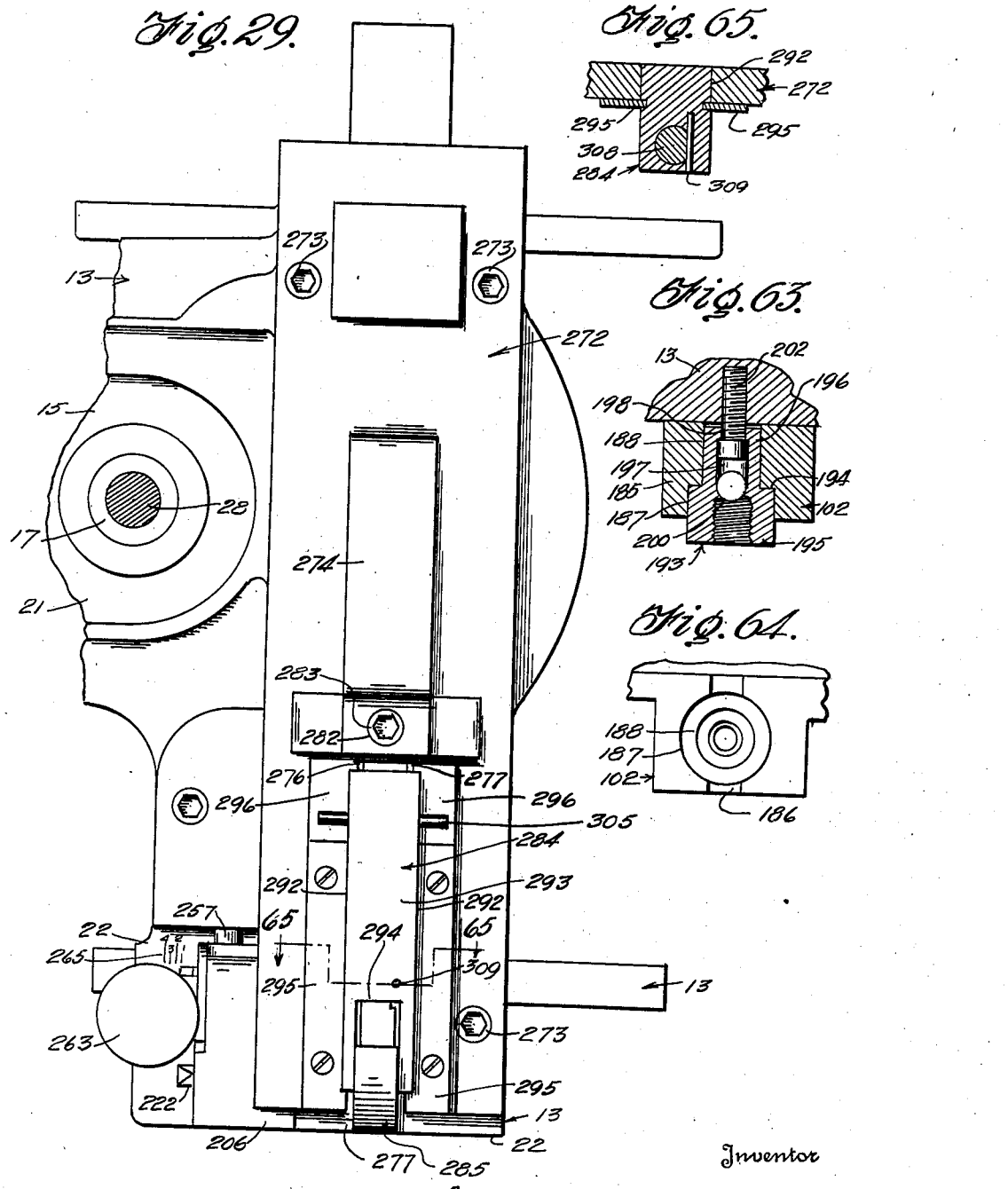

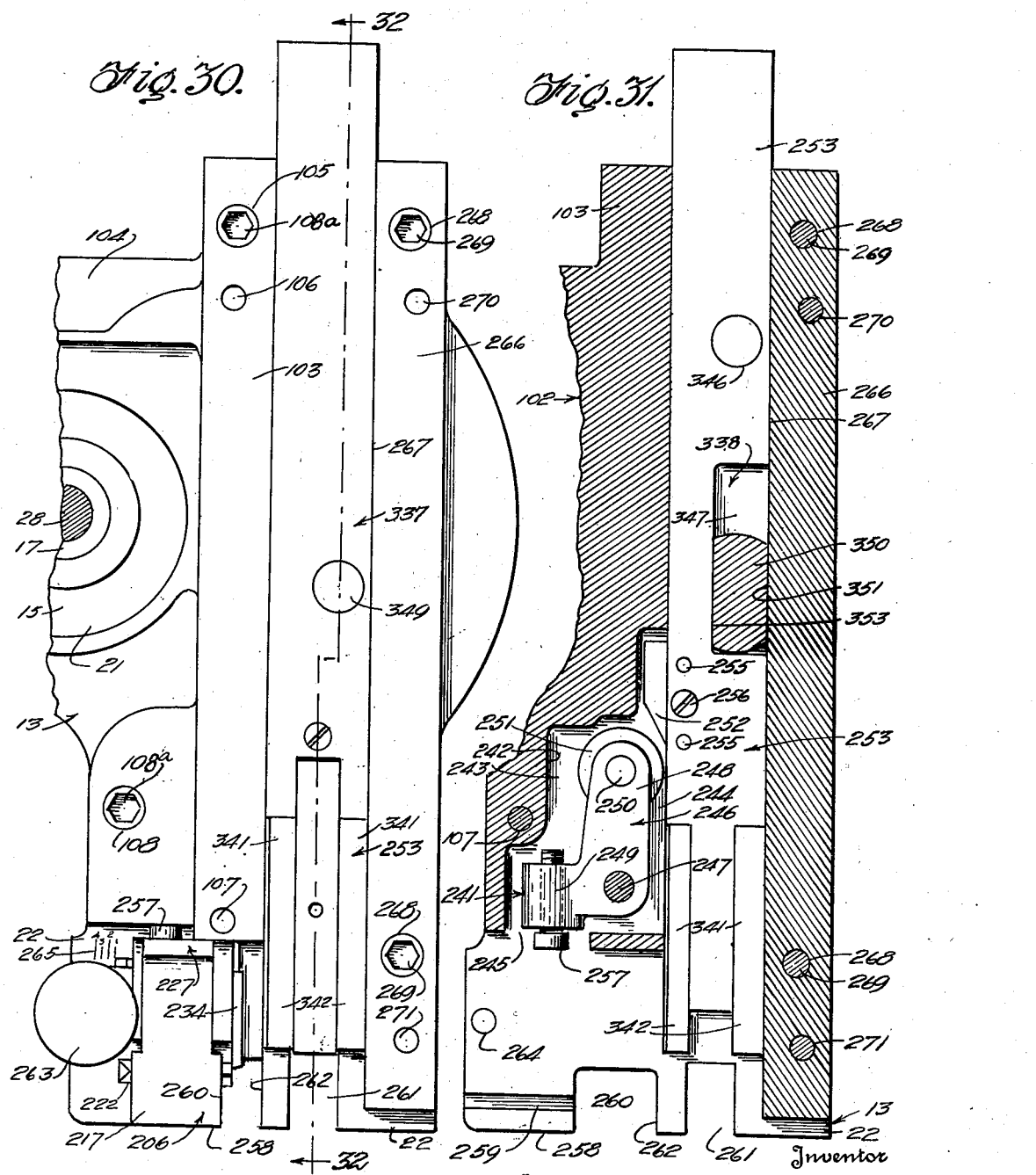

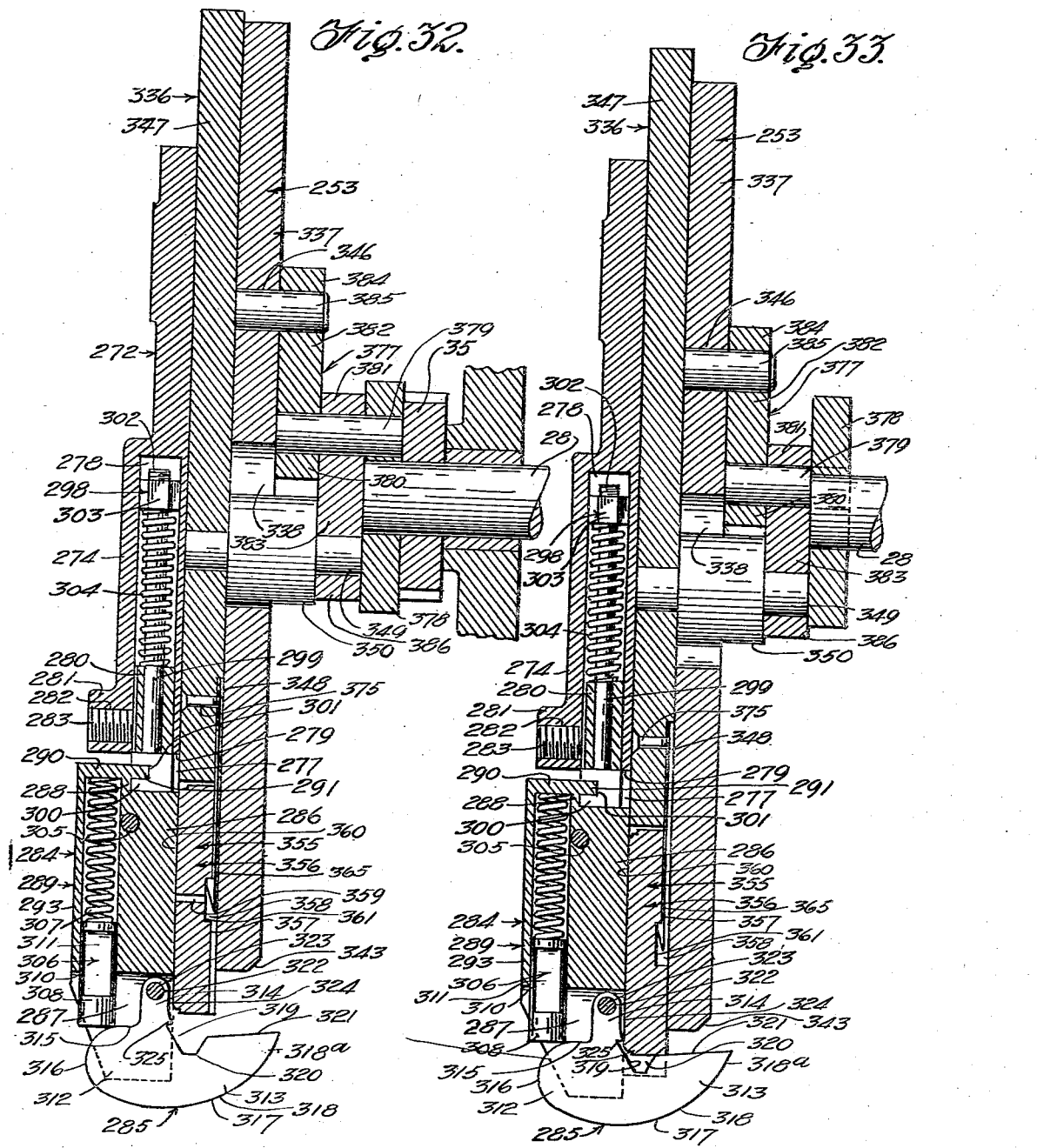

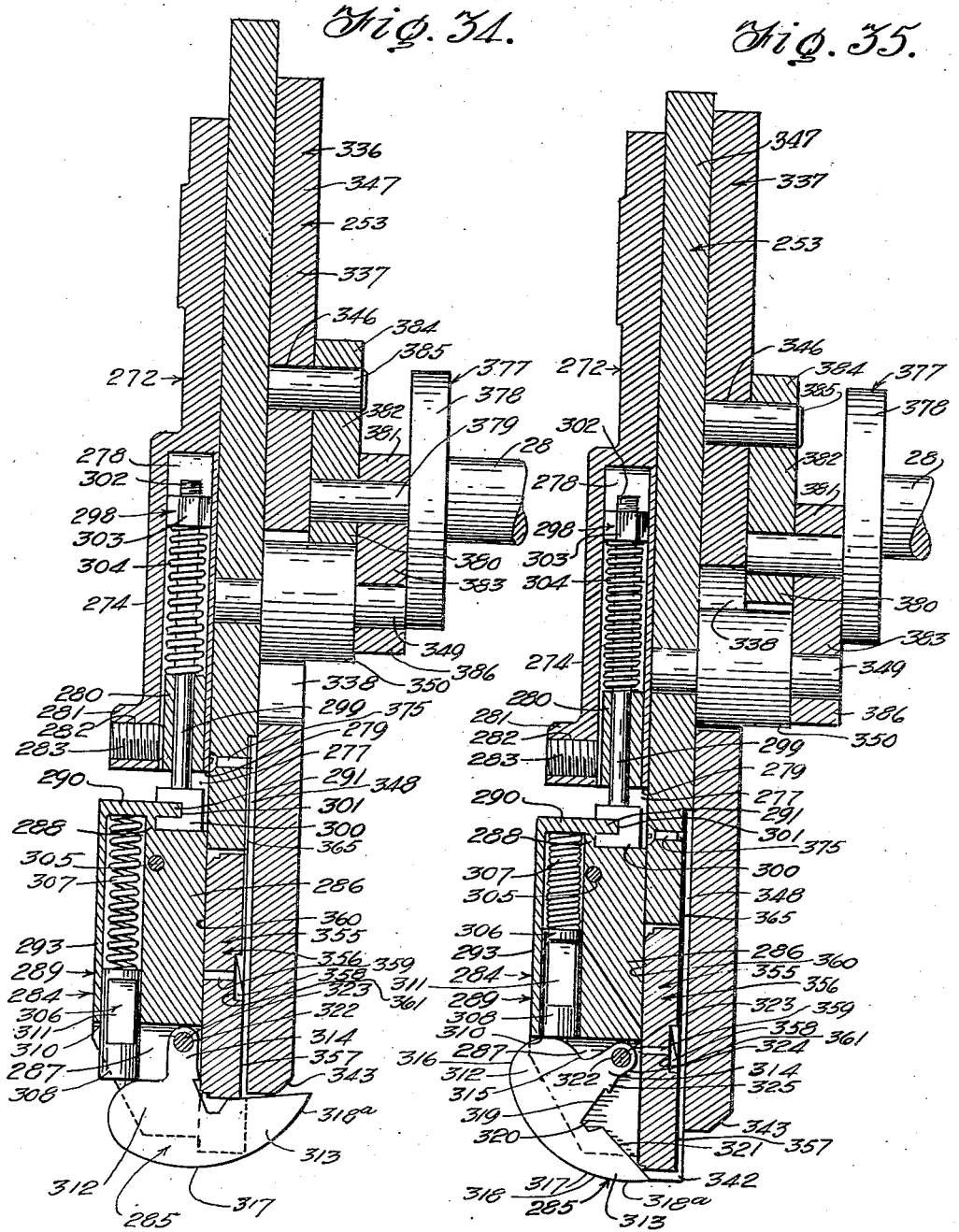

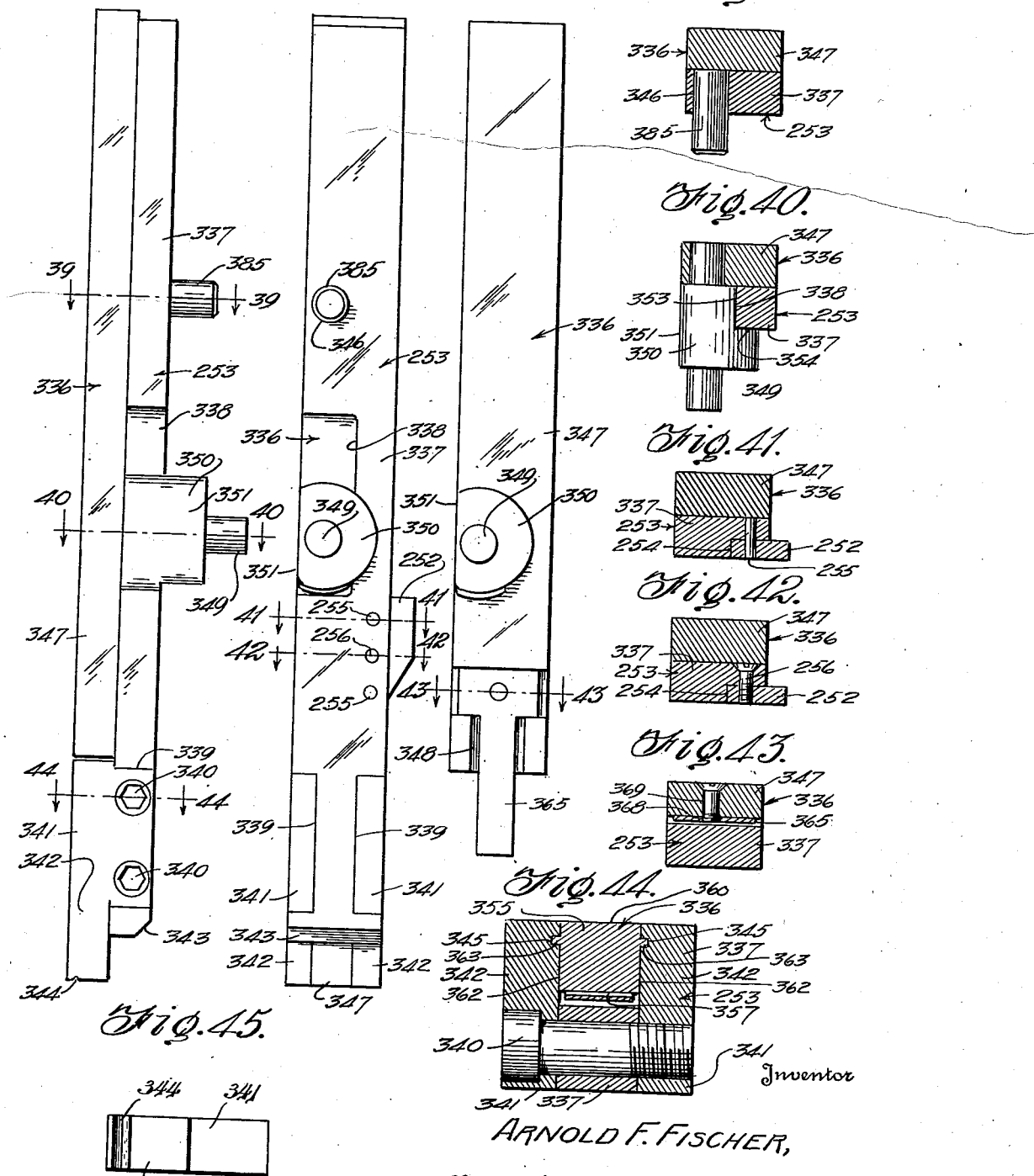

Nov. 7, 1939.   A. F. FISCHER   2,179,036
COMBINED STAPLE FORMING AND DRIVING MACHINE
Filed April 2, 1938   13 Sheets-Sheet 12
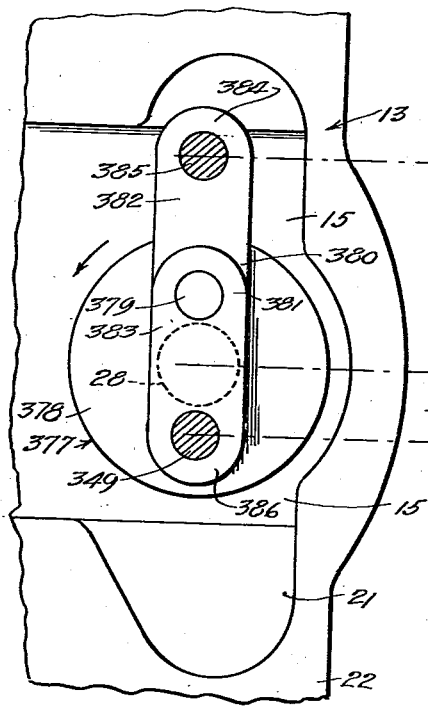
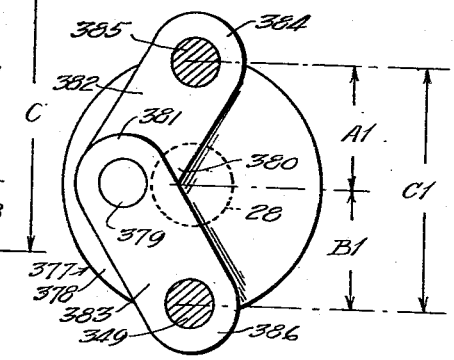
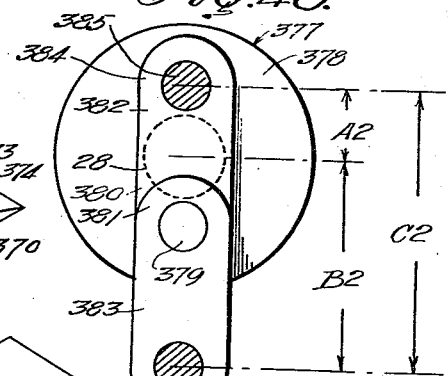
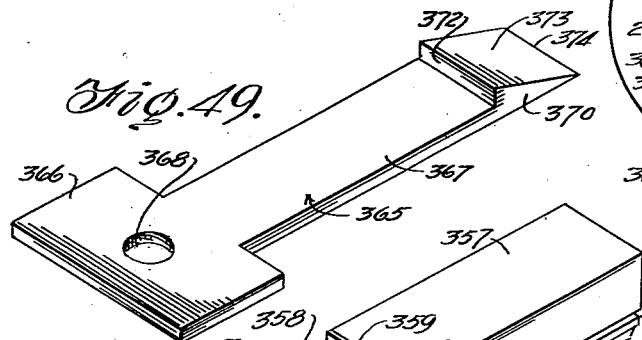
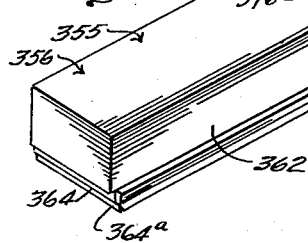
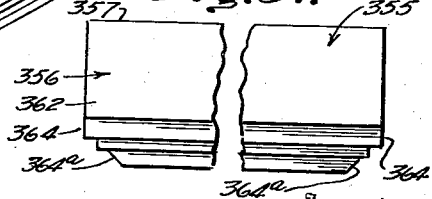
Inventor
ARNOLD F. FISCHER,
By Kimmel & Crowell
Attorneys

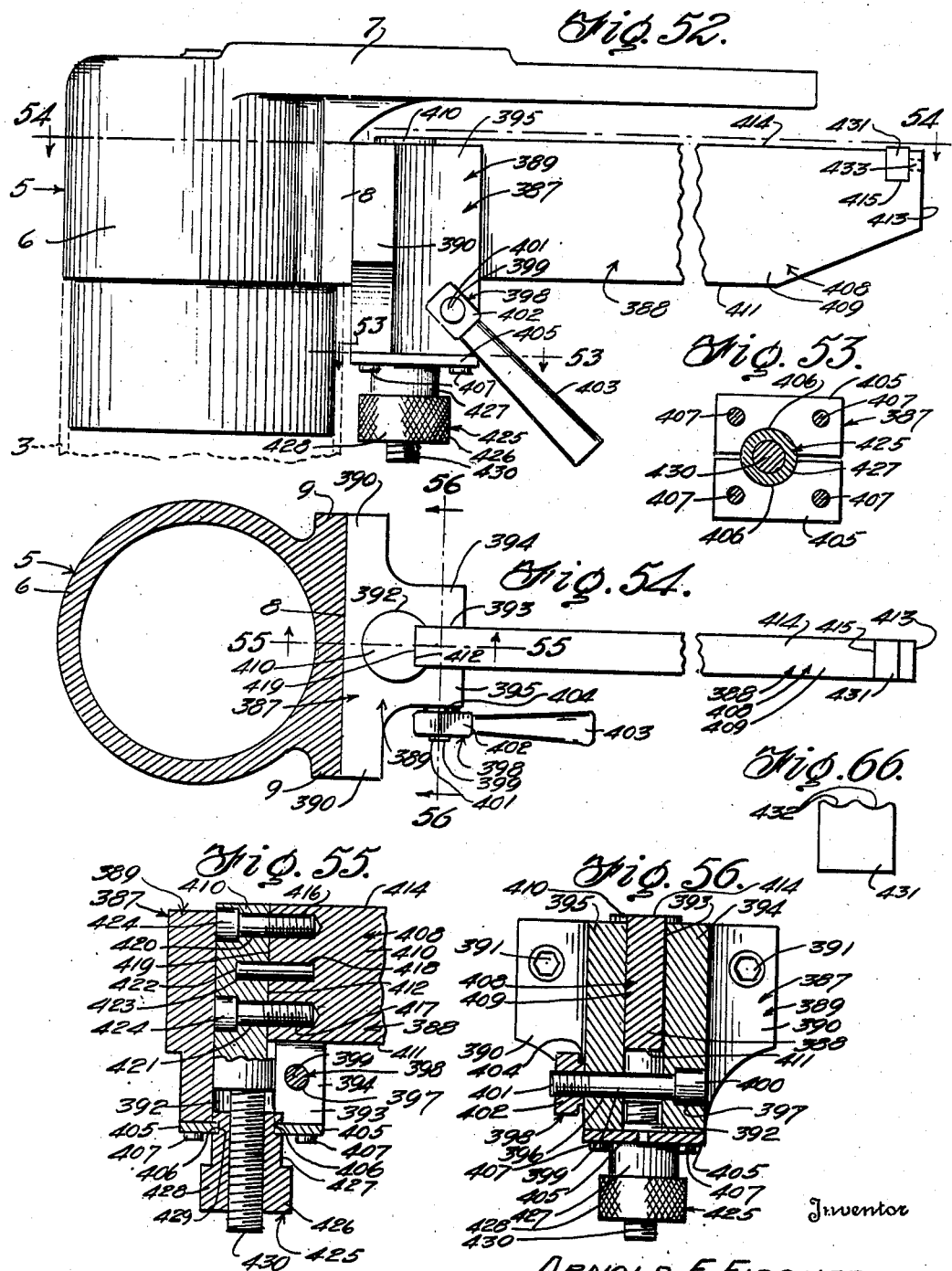

Patented Nov. 7, 1939

2,179,036

UNITED STATES PATENT OFFICE 2,179,036

COMBINED STAPLE FORMING AND DRIVING MACHINE

Arnold Ferdinand Fischer, Astoria, N. Y., assignor to Hobbs Sales & Service Station, Inc., New York, N. Y., a corporation of New York Application April 2, 1938, Serial No. 199,701

16 Claims. (Cl. 1—2)

This invention relates to a staple forming and driving machine designed primarily for stapling the folded portions of the walls of paper boxes together, but it is to be understood that the machine, in accordance with this invention is for use in any connection for which it may be found applicable.

The invention has for one of its objects to provide, in a manner as hereinafter set forth, a machine for the purpose referred to including an automatically arrestable releasable means for intermittently controlling the stapling cycles of the machine.

The invention has for another of its objects to provide, in a manner as hereinafter set forth, a machine for the purpose referred to including a brakeless automatically arrestable releasable means for intermittently controlling the stapling cycles of the machine, and with said means having the parts thereof so related to discontinue the operation of the machine and to prevent backlash at the completion of a stapling cycle.

The invention has for another of its objects to provide, in a manner as hereinafter set forth, a machine for the purpose referred to including means to prevent the staple being formed with legs of uneven length.

The invention has for other of its objects to provide, in a manner as hereinafter set forth, a machine for the purpose set forth, a spring controlled hanger for an anvil which associates with a staple former and with the hanger, anvil and former being so related and constructed to give the wire from which the staple is formed the opportunity to seat itself correctly and to prevent it from jumping out of the anvil.

The invention has for another of its objects to provide, in a manner as hereinafter set forth, a machine for the purpose set forth, a face plate for detachable connection to the body of the machine and carrying a spring controlled vertically movable hanger, a tiltable combined anvil and staple supporting element connected to the hanger and a spring controlled plunger mounted in the hanger for coaction with said element, and with the said face plate capable of being quickly removed whereby said hanger, plunger and element may be conveniently adjusted when occasion requires.

The invention has for another of its objects to provide, in a manner as hereinafter set forth, a machine for the purpose referred to including a tiltable combined anvil and staple supporting element so constructed and arranged to prevent it sticking on soft, spongy stock on the delivering of the staple therefrom to the stock.

The invention has for another of its objects to provide, in a manner as hereinafter set forth, a machine for the purpose referred to having an adjustable intermittently operable wire feeding mechanism including a pair of feed rolls so arranged, constructed and operated for equalizing pressure alike on the wire, during the feed of the latter which results in an even pull on the wire and minus a sudden thump as the rolls move into active feeding relation with respect to the wire.

The invention has for another of its objects to provide, in a manner as hereinafter set forth, a machine for the purpose referred to including a wire cutter mechanism, a staple former mechanism, a tiltable vertically movable spring controlled, a combined anvil and staple supporting element coacting with the former mechanism and on which the staple is formed, supported and discharged from, and a driver mechanism for the formed staple mounted in the former mechanism and acting to discharge the staple from said element and driving it into the work.

The invention has for another of its objects to provide, in a manner as hereinafter set forth, a machine for the purpose referred to including a tiltable vertically movable spring controlled combined anvil and staple supporting element and adjustable means for intermittently feeding a length of wire stock across said element to be acted upon to form a staple which subsequently is discharged therefrom and driven in the work to be stapled.

The invention has for another of its objects to provide, in a manner as hereinafter set forth, a machine for the purpose referred to including a tiltable combined anvil and supporting element for a severed length of wire stock from which the staple is formed and with said element being so mounted to move vertically during the formation of the staple and then subsequently be tilted to permit of the staple being discharged therefrom.

The invention has for another of its objects to provide, in a manner as hereinafter set forth, a machine for the purpose referred to including a reciprocatory staple former mechanism, a reciprocatory staple driver mechanism, and means whereby a differential movement in like directions is imparted to said mechanisms to provide for their activity.

The invention has for another of its objects to provide, in a manner as hereinafter set forth, a machine for the purpose referred to including a reciprocatory staple driver mechanism and an adjustable staple clincher structure coacting with the driver mechanism for clinching the staple to the work.

Further objects of the invention are to provide, in a manner as hereinafter set forth, a machine for the purpose referred to which is comparatively simple in its construction and arrangement, strong, durable, compact, readily assembled, conveniently repaired when occasion requires, intermittently operated, automatically controlled as to the intermittent operation thereof, possessing a safety characteristic with respect to the attendant or operator, thoroughly efficient in use for the purpose intended thereby, adjustable, enabling an attendant to easily couple the machine to a prime mover for the latter, and comparatively inexpensive to build.

Embodying the aforesaid objects and others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings—

Figure 2:
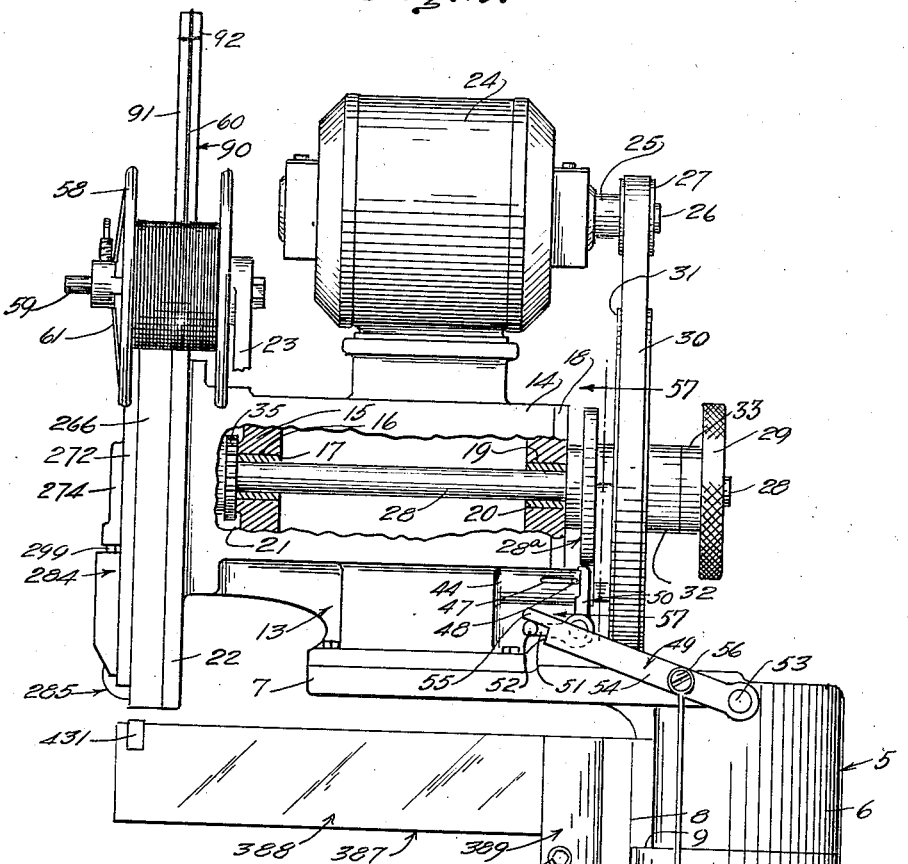
Figure 58:
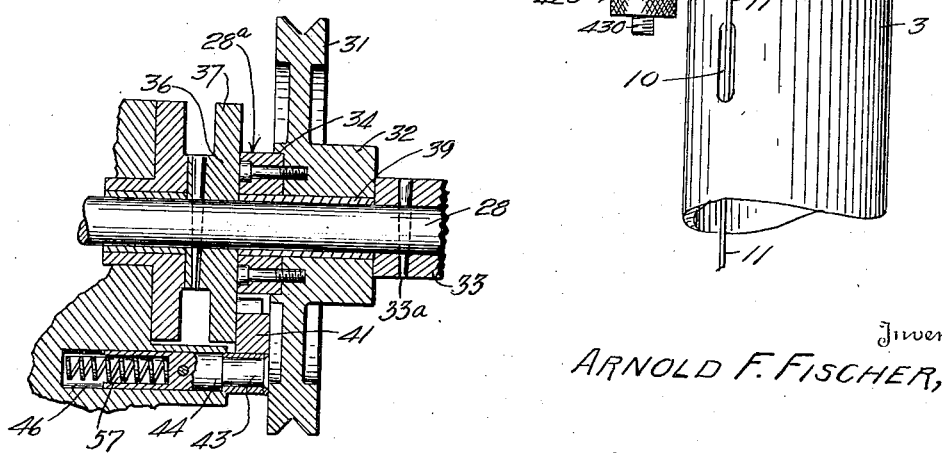

Figure 1 is a front elevation of the machine broken away,

Figure 2 is a fragmentary view in side elevation and partly in section of the machine, Figure 3 is a front elevation, broken away of the combined wire check and guide structure, Figure 4 is a side elevation of said structure, Figure 5 is a section on line 5—5, Figure 3, Figure 6 is a section on line 6—6, Figure 4, Figure 7 is a section on line 7—7, Figure 3, Figure 8 is a section on line 8—8, Figure 6, Figure 9 is a fragmentary view in front elevation illustrating the wire-feed mechanism, Figure 10 is a section on line 10—10, Figure 9, Figure 11 is a section on line 11—11, Figure 10, Figures 12, 13, 14 and 15 are respectively sections on lines 12—12, 13—13, 14—14, and 15—15, Figure 11, Figure 16 is a perspective view of the non-adjustable carrier of the wire-feed mechanism, Figure 17 is a perspective view of the adjustable carrier of the wire-feed mechanism, Figure 18 is a front elevation of the front clamp of the wire-feed mechanism, Figure 19 is a perspective view of the rear clamp of the wire-feed mechanism, Figure 20 is a view illustrating in front elevation the gear drive of the wire-feed mechanism, Figure 21 is a front elevation of the wire-cutter mechanism, Figure 22 is a side elevation of the wire-cutter mechanism, Figure 23 is a top plan view of the wire-cutter mechanism, Figure 24 is a section on line 24—24, Figure 21, Figure 25 is a perspective view of the body part of the wire-cutter mechanism, Figure 26 is a perspective view of the movable blade carrier of the wire-cutter mechanism, Figure 27 is a side elevation of the fixed blade of the wire-cutter mechanism, Figure 28 is an end view of said fixed blade, Figure 29 is a fragmentary view in front elevation illustrating the front plate of the machine, the spring controlled hanger for the combined anvil and staple supporting element, the said element and the wire-cutter mechanism, Figure 30 is a view similar to Figure 29 without the face plate and illustrating the wire-cutting mechanism, the staple former mechanism and the staple driver mechanism, Figure 31 is a vertical sectional view partly in elevation illustrating the staple-former mechanism and the means for operating the wire cutter mechanism, Figures 32, 33, 34 and 35 are vertical sections on line 32—32 of Figure 30 illustrating the initial or normal position of the hanger structure, combined anvil and supporting element, the staple former mechanism and staple driver mechanism and the positions they successively are arranged in from the point of forming the staple to the point of driving the staple, Figure 36 is a side elevation of the staple former mechanism and staple driver mechanism disposed in assembled relation, Figure 37 is a rear elevation of the staple former and driver mechanisms assembled, Figure 38 is a front elevation of a part of the staple driver mechanism, Figures 39 and 40 are respectively sections on lines 39—39, and 40—40, Figure 36, Figures 41 and 42 are respectively sections on lines 41—41 and 42—42, Figure 37, Figure 43 is a section on line 43—43, Figure 38, Figure 44 is a section on line 44—44, Figure 36, Figure 45 is a bottom plan of one of the jaws of the former mechanism, Figure 46 is a fragmentary view in front elevation, partly in section of the revoluble actuating mechanism common to the staple former and driver mechanisms and having combined therewith a diagram illustrating the initial or normal position of said staple former and driver mechanisms with respect to the points of connection thereof with the actuating mechanism, Figure 47 is a front elevation of the said actuating mechanism showing the position, on a quarter revolution thereof with respect to the staple former and driver mechanisms combined with a diagram illustrating the extent of the differential movement given to the staple former and driver mechanisms, Figure 48 is a front elevation of the said actuating mechanism showing its position on a half revolution thereof with respect to the staple former and driver mechanisms combined with a diagram illustrating the extent of the differential movement given to the staple former and driver mechanisms on completion and driving of the staple, Figure 49 is a perspective view of the holding spring for the driver element of the driver mechanism, Figure 50 is a perspective view of the driver element of the driver mechanism, Figure 51 is a side elevation, broken away of the said driver element, Figure 52 is a side elevation upon an enlarged scale and broken away of the clinching structure, Figure 53 is a section on line 53—53, Figure 52, Figure 54 is a section on line 54—54, Figure 52, Figures 55 and 56 are respectively sections on lines 55—55 and 56—56, Figure 54, Figure 57 is a section on line 57—57, Figure 2 illustrating an automatically controllable clutching mechanism for intermittently connecting the driving mechanism of the machine to a prime mover and with the clutching mechanism in nonactive position, Figure 58 is a section on line 58—58, Figure 57, Figure 59 is a section on line 57—57, Figure 2 with the clutching mechanism in active position,

Figure 60 is a section on line 57—57, Figure 2 illustrating the parts of the clutching mechanism as they appear immediately after said mechanism has been shifted from active position, Figure 61 is a section on line 61—61, Figure 9, Figure 62 is a fragmentary view in front elevation of the top wall of the recess of the wire feed mechanism, Figure 63 is a section on line 63—63, Figure 9 with the socket screw member omitted, Figure 64 is a fragmentary view in front elevation of the top wall of the recess aforesaid, Figure 65 is a section on line 65—65, Figure 29, and Figure 66 is a side elevation of the staple clinching member.

The machine includes a supporting stand 1 formed of a hollow base 2 and a tubular standard 3 having its lower end anchored as at 4 to the rear of the top of the base. Standard 3 is open at its upper end. Extending into, secured with, seated on and projecting above the top edge of standard 3 is a head-piece 5 formed of a peripherally shouldered body part 6 having integral therewith at the top thereof, a supporting arm 7 disposed at right angles thereto and overhanging base 2. The front of body part 6 from the inner end of the lower face of arm 7 to the top edge of standard 3 is inset, as at 8. The outer face of said inset 8 is squared. Integral with body part 6 is a pair of oppositely disposed laterally extending spaced aligned upstanding lugs 9 having their front faces forming flush continuations of the outer face of inset 8. The lugs 9 are integral with the inner end of the lower face of arm 7 and seat on the top edge of standard 3. The latter in proximity to its upper end and lengthwise thereof is formed with a slot 10, through which extends the upper portion of an upstanding pull rod 11 for shifting the releasing means of a clutching mechanism to be referred to. The remaining portion of rod 11 is arranged in standard 3 and base 2. Suitably connected to the front of base 2 is a spring controlled foot pedal 12 which is attached to the lower end of rod 11 in a manner to provide for the lowering of the latter when pedal 12 is depressed.

The machine includes a supporting structure 13 for elements thereof and which is seated on and anchored to arm 7. The structure 13 is formed with a housing 14 having an integral front wall 15 formed with an axial opening 16 in which is mounted a bearing bushing 17. The housing 14 includes a removable rear wall 18 suitably secured to the rear end of and extending therein. The wall 18 is formed with an axial opening 19 in which is arranged a bearing bushing 20. The structure 13 is formed with an open front chamber 21 disposed forwardly of the front end of and extending laterally with respect to the housing 14. The structure 13 at the front end of chamber 21 includes a depending extension 22. The structure 13 is formed with an upstanding outwardly inclined arm 23 integral at its lower end with one side of chamber 21. The prime mover for the machine is in the form of an electric motor 24 which seats on and is anchored to the top of the structure 13. The shaft 25 of motor 24 is extended as at 26 and carries a driving pulley 27 disposed rearwardly with respect to the rear end of housing 14.

Mounted in the bushings 17, 20 and extending forwardly from bushing 17 into the chamber 21 is the operating shaft 28 which is driven from and intermittently coupled to the portion 26 of the shaft 25 of the motor 24. The shaft 28 extends rearwardly from bushing 20 and carries a hand wheel 29 for manually rotating it, when desired to set the machine prior to its operation from the motor. The shaft 28 is driven from shaft 25 by a transmission consisting of the pulley 27, an endless belt 30 and a peripherally grooved pulley 31 loosely mounted about and adapted to be intermittently clutched by a means to be referred to with the shaft 28. The pulley 31 is of materially greater diameter than the pulley 27. The hub of pulley 31, indicated at 32, extends outwardly with respect to the web of such pulley (Figure 58) and has its outer end bearing against the hub 33 of the hand wheel 29. The hub 32 is formed with a circular recess 34 at its inner end. The hub 33 is detachably secured to shaft 28 by the pin 33ª. The shaft 28 forwardly of bushing 17 and within chamber 21 has fixed thereto a gear wheel 35 the purpose of which will be referred to.

The machine includes an automatically arrestable manually releasable means for intermittently controlling the stapling cycles. The said means is in the form of a clutch mechanism 28ª for intermittently coupling the shaft 28 with the pulley 31 whereby the shaft will be intermittently driven to the extent of a complete revolution at each clutching thereof with pulley 31. The clutch mechanism is of the same form, arrangement and functions in the same manner as the clutching mechanism forming the subject matter of my copending application Serial Number 189,460, filed February 8, 1938. The clutching mechanism is best shown in Figures 2, 57, 58, 59, 60, and it includes a sleeve 36 mounted on and fixed to shaft 28 outwardly of the rear end of housing 14. The sleeve 36 at its rear end is formed with a laterally extending annular flange 37. Extending into the recess 34 and secured to the pulley 31 is a ratchet element 38. The latter is bodily carried with pulley 31. Interposed between shaft 28 and the hub 32 of pulley 31 is a bearing bushing 39. The element 38 has a wiping contact with the rear or outer end of sleeve 36 and coacts with hub 32 to prevent the lengthwise shifting of pulley 31 and bushing 39 relative to shaft 28.

Connected to the flange 37, extending towards the pulley 31 and spaced from the element 38 is a pivot 40 for a spring controlled pawl 41 which coacts with the ratchet element 38 to clutch shaft 28 with pulley 31 to provide for the driving of the latter from the motor. The outer end portion of pawl 41 has the outer lengthwise edge thereof formed with a semi-circular cut-out 42 forming a gullet for receiving the spring controlled plunger 43 of a stop structure 44 acting to shift pawl 41 on its pivot, in a direction to swing the nose 44 of the pawl clear of ratchet element 38 to unclutch shaft 28 from driven relation with respect to the motor.

The controlling spring for pawl 41 is indicated at 45, and it normally tends to move pawl 41 in a direction to have its nose 44 to engage one of the teeth of the ratchet element 38, but such movement is arrested by the plunger 43. The flange 37 carries a stop 45ª for arresting the movement of the outer end portion of pivot 41 towards element 38.

The structure 44 is horizontally disposed and mounted in a socket 46 formed in the lower portion of the rear end of the supporting structure 13. The structure 44 is formed with a slot 47 through which extends an abutment 48 of rod-like form carried by plunger 43. The abutment 48 is arranged in the path of the releasing structure 49 of the clutch mechanism. The structure 49 includes an arm 50 for shifting the abutment 48 to move plunger 43 clear of pawl 41 to provide for the clutch mechanism acting to clutch shaft 28 with the shaft of the motor. The structure 49 includes an arm 51 which is integral with the lower end of and disposed at right angles to arm 50. The said arms are mounted in a manner to be shifted on a like direction in unison. The arm 51 carries a headed bolt 52 extending laterally therefrom and with the head of the bolt spaced from the arm.

It is to be understood that the clutch mechanism which is associated with shaft 28 and pulley 31 will be identical in construction and operation as the clutch mechanism forming the subject matter of my copending application aforesaid, and therefore it is thought not necessary to describe such mechanism as to every one of its details, as the parts which are referred to of such mechanism will be a sufficient description to enable one to understand the function of the mechanism with respect to the shaft 28. This statement also applies to the stop and releasing structures 44 and 49 which form elements of the clutch mechanism.

Pivotally connected, as at 53, to the head piece 5 is the lower end of a forwardly extending upwardly inclined lever 54 having a reduced upper end terminal portion 55 which seats on the bolt 52 between the head of the latter and arm 51. Pivotally connected to the lever 54 at a point between its transverse medium and its lower end, as at 56, is the upper end of the pull rod 11.

The controlling spring 57 for the plunger 43 normally maintains the lever arm 54 in the position shown in Figure 2. The normal position of the outer end of plunger 43 is within the gullet provided by the cut-out 42 and which maintains the pawl 41 in the position shown in Figure 57 and shaft 28 not clutched with relation to shaft 26. When lever 54 is shifted downwardly by the pull rod 19, due to the application of downward pressure on front end of the treadle 12, the arm 51 will be carried downward in an anti-clockwise direction and move arm 50 in a like direction carrying the abutment 48 therewith, which in turn will shift plunger 43 in a direction to move it clear of the gullet and also clear of pawl 41. The latter will then be permitted to engage the edge of element 38 and as the latter is revolving against pulley 31, the nose of pawl 41 will engage a ratchet of element 38 and provide for the clutching of sleeve 36 to pulley 31 whereby shaft 28 will be driven from the motor shaft.

Immediately after the upper end of lever 51 has been lowered, the pull rod 11 is released and the plunger 43 will automatically assume the position shown in Figure 60, and as pawl 41 bodily moves with the sleeve 36, it will have a portion of its rear or outer edge contact with the plunger 43 to automatically move the pawl 41 clear of element 38 and to the position shown by Figure 60, whereby the shaft 28 will be unclutched with relation to the shaft 26. After pawl 41 has been shifted to the position shown in Figure 60, the controlling spring for the pawl will shift the nose of the latter towards the element 38, but the wall of the gullet contacting with the plunger 43 will arrest such movement and releasably hold pawl 41 in the position shown in Figure 57 that is clear of element 38.

The operating means of the machine, which is intermittently revolved, to an extent of a complete revolution is provided by the shaft 28, gear 35 and the clutch mechanism.

The machine includes a wire stock carrier in the form of a spool 58 revolubly mounted on a shaft 59 connected to and extending forwardly at right angles to the upper end of the arm 23. The stock is in the form of wire 60 of the desired gauge coiled around and intermittently reeled off of the spool 58. The shaft 59 carries a friction brake 61 which bears against the spool 58 to prevent the accidental revolving of the latter.

The machine includes a combined wire check and guide structure 62 (Figures 1 and 3 to 8) for conducting the wire to a wire-feed mechanism. The structure 62 includes a casting 63 having a horizontally disposed angle-shaped base part 64 formed of a front and a rear arm 65, 66 respectively, disposed at right angles to each other. The arm 65 is of greater length than arm 66. The width of the latter is less than the length of arm 65. The front end of arm 66 is integral with the rear edge of and has its outer side edge flush with the outer side edge of arm 65. The latter is formed with a vertical disposed passage 67 extending from its bottom to its top, a threaded port 68 disposed longitudinally thereof and opening at its outer end at the outer side of said arm and at its inner end into the passage 67, and a horizontally disposed countersunk opening 69 extending from the front face to the rear face thereof. The opening 69 is arranged in close proximity to the inner side of arm 65. The casting includes a vertically disposed arm 70 which is integral with a portion of the upper face and has its inner side edge aligned with the inner side edge of arm 65. The front and rear edges of arm 70 are flush respectively with the front and rear edges of arm 65. The front of arm 70 is rabbeted as at 71. Secured by the holdfast means 72 in the rabbet 71 is a plate 73 formed at its inner side with a lateral extension 74 which overhangs in spaced relation the exposed portion of the upper face of arm 65. The extension 74 in proximity to its outer end is formed with an opening 75 through which passes a rearwardly extending pivot element 75ª formed of an outer end portion 76, an outer intermediate portion 77 of greater diameter than the portion 76, an inner intermediate portion 78 of greater diameter than portion 77 and an inner end portion 79 corresponding in diameter to the portion 77. The portion 76 is arranged with and extends forwardly from opening 75. The portion 76 outwardly adjacent the extension 74 is provided with peripheral threads. The portion 79 in proximity to its inner end is formed with a diametrically disposed opening 80.

The combined wire check and guide structure 62 includes a spring controlled check 81 for a purpose to be referred to. The check 81 consists of a pivotally supporting latching member 82 having its length materially greater than its width. The member 82 is disposed on its lower lengthwise edge and is formed with a nose 83 at its lower inner corner for a purpose referred to. The member 82 between its vertical median and inner end is formed with an opening 84 for mounting it on the portion 77 of element 75ª. The said portion 77 constitutes a pivot on which member 82 is loosely mounted for movement relative to extension 74. When member 82 is positioned on the element 75ª it is arranged between the said portion 78 of the latter and the extension 74. The structure 62 includes a controlling spring 85 for member 82. The spring 85 is of the coiled type and has extended end portions 86, 87. The body of spring 85 is mounted on the end portion 79 of element 75ª and is connected to the latter by the arrangement of spring end portion 86 in the opening 80. The spring end portion 87 is connected to a rearwardly extended pin 88 carried by member 82 in proximity to the outer end of the latter. The spring 85 normally tends to releasably maintain the nose 83 of member 82 in engagement with the wire 60 after each intermittent feed thereof towards the wire-feed mechanism to check or hold the wire 60 stationary. The element 75ª is secured to the extension 74 by a clamping nut 89 binding against the latter and coacting with the portion 77 of such element. The nut 89 threadedly engages with the portion 76 of element 75ª.

The structure 62 includes an upper combined wire guide and retainer element 90 as the wire intermittently reels off of the spool 58. The element 90 is in the form of an upstanding straplike strip 91 of metallic material having an inwardly curved upper portion 92 arranged above the spool 58. The remaining portion 93 of the strip 91 is vertically disposed. The lower end of strip 91 is seated against the upper face of arm 65 at the inner side of passage 67. The lower part of the portion 93 of strip 91 is positioned against the outer side edge of arm 70 and is secured to the latter by spaced holdfast means 94 disposed rearwardly with respect to the lengthwise median of the strip 91. The latter has secured thereto and extending from its outer face spaced retainers 95 for confining thereon that portion of the wire guided thereby. The retainers 95 are in the form of yokes through which pass the wire. The retainers 95 are disposed forwardly with respect to the longitudinal median of the strip. The latching member opposes that side portion of strip 91 to which the retainers 95 are attached.

The structure 62 includes a lower wire guide 96 which depends from the arm 65 to a point between the upper portions of the feed rollers of the wire-feed mechanism and in this connection attention is directed to Figures 1 and 9. The guide 96 is vertically disposed, of tubular form and has its lower portion 97 gradually decreasing in outer diameter throughout. The upper terminal portion 98 of guide 96 is arranged in the passage 67. The upper end of guide 96 is flush with the upper face of arm 65. The portion 98 of guide 96 is clamped in the passage 67 by a clamping screw 99 threadedly engaging with the wall of port 68.

The casting 63 of structure 62 is anchored to the structure 13 by the holdfast means 100 (Figure 1) extending through opening 69 and engaging in that part of structure 13 which provides the top wall of chamber 21. The casting 63 is arranged above chamber 21 and is disposed forwardly with respect to the latter. The arm 66 of the casting 63 abuts the supporting structure 13.

The wire-feed mechanism 101 best shown in Figures 9 to 20 is detachably connected to front of the structure 13, and is arranged within, extended forwardly and bodily removable from the chamber 21. The mechanism 101 includes a one-piece support 102 which forms a closure for the major portion of the open front of chamber 21, a carrier for the other parts of such mechanism and one of the guide sections for the staple former and staple driver mechanisms. The support 102 includes a vertically disposed part 103, of square cross section at the inner side thereof and an upstanding part 104 extended outwardly at right angles to the outer side of part 103. The part 104 is disposed on its lower lengthwise edge and is of less height and of greater width than part 103. The inner side of part 104 is spaced from the upper and lower ends of and inset with respect to the front of part 103. The latter forms the guide section referred to and is provided near its upper end with an opening 105 and below the latter with an upper and a lower threaded opening 106, 107 respectively of less diameter than the opening 105. The part 104 in its lower portion and in proximity to part 103 is formed with an opening 108 of the same diameter as opening 105 and arranged above the opening 107. The support 102 is positioned relative to the structure 13 for closing the major portion of open front of chamber 21. The remaining portion of the open front of chamber 21 is closed by the staple former mechanism to be referred to and the other guide section, to be referred to for the former and driver mechanisms. The support 102 is detachably secured to the structure 13 by holdfast means 108ª passing through openings 105, 108 and threadedly engaging in the front of said structure 13.

The part 104 is formed lengthwise thereof and in its front with an oval shaped recess 109. The base wall 109ª of the recess is provided with a pair of spaced aligned openings 110, 111 and on its inner face with a pair of spaced rearwardly extending collars 112, 113 having their inner faces forming continuations of the walls of the openings 110, 111 respectively. Mounted in the openings 110, 111 and passing through the collars 112, 113 are rearwardly extending bearing business 114, 115 respectively.

Mounted in the bushings 114, 115 are operating shafts 116, 117 for the feed roll structures 118, 119 respectively. The shafts 116, 117 operate respectively in clockwise and anti-clockwise directions. The said shafts are of a length to extend from a point forwardly of the support 102 and through the chamber 21. The rear wall of the latter is indicated at 120 and is formed with spaced aligned openings 121, 122 in which are arranged bearings bushings 123, 124 respectively for the rear end terminal portions of the shafts 116, 117 respectively. The wall 120 is provided with forwardly and rearwardly extending annular bosses 125, 126 respectively which have their inner faces form flush continuations of the openings in such wall and in which are arranged the bushings 123, 124. Fixed to the shafts 116, 117 are intermeshing gears 127, 128 respectively which are positioned against the bosses 125 and front ends of the bushings 123, 124. The gears 127, 128 are provided with outwardly extended hubs 129, 130 respectively which bear against the rear ends of the bushings 114, 115 respectively. Extending diametrically through the gear hubs and said shafts are pins 131, for fixedly securing each gear to its respective shaft.

The feed roll structure 118 includes a carrier 132 consisting of a circular disc 133 having integral with its front face an extension 134 inset with respect to the edge 135 of the disc. The extension 134 is of a contour greater than a half circle and less than a full circle thereby providing it with a straight edge 136 and a curved edge 137 of greater length than edge 136. The edge 137 is disposed in concentric spaced relation with respect to the edge 135 of disc 133. The edge 136 is spaced from one side of the axis of disc 133. The carrier 132 is formed with an axial opening 138 which extends through the disc 133 and extension 134. The disc 133 is formed diametrically thereof with an opening 139 which is intersected by the opening 138. The disc 133 is also formed with a pair of diametrically aligned openings 140. Arranged against the front face of disc 133 and encompassing the extension 134 is an annular split cam 141 of flat ring-like form having a part of its inner edge bearing against the curved edge 137 of the extension 134. The major portion of its outer edge of cam 141 is flush with the outer edge of disc 133. The split in cam 141 is indicated at 142. The cam 141 is formed of a fixed portion 143 and a resilient portion 144 of less length than portion 143. The latter is formed with a pair of horizontally aligned spaced openings 145 which register with the openings 140 in disc 133. Extending through the registering openings 140, 145 are holdfast means 146 for fixedly securing the portion 143 of cam 141 to the front face of disc 133. The resilient portion 144 of cam 141 is spaced from the straight edge of 136 of extension 134 whereby a clearance is provided for cam portion 144 when the latter is depressed towards the axis of the carrier 132. The cam 141 includes a high part 147 formed on the outer edge of cam portion 144. The high part 147 is of a length to extend from a point removed from the point of mergence of the cam portions 143, 144 to the outer end of one of the edges of the split 142. The high part 147 is arranged exteriorly of the edge 135 of disc 133 and constitutes what may be termed one of the grippers for the wire stock when intermittently feeding the latter.

Positioned against the front of the extension 134 and the cam 141 is an axially apertured confiner 148 for the high part 147 of cam 141. The carrier 132 is positioned against the front of the base wall 109ª of recess 109 and it is mounted on, through the medium of its opening 138 on the part 149 of the shaft 116 arranged in recess 109. The front end of shaft 116 is flush with the front of extension 134. The part 149 of shaft 116 is formed with a diametrically disposed opening 150 which intersects and registers with the opening 139. Extending through the registering openings 139, 150 is a holdfast means 151 for fixedly securing shaft 116 and structure 118 together whereby they will bodily revolve in unison. The axial aperture in confiner 148 is indicated at 152 and countersunk. The aperture 152 registers with the mouth of a screw threaded socket 153 formed in the shaft part 149. Extending through aperture 152 and threadedly engaging with the wall of socket 153 is a holdfast means 154 for securing the confiner 148 in position relative to shaft 116, carrier 132 and cam 141. The elements of the feed roll structure 118 are not adjustable relative to each other or with relation to shaft 116 and such elements are permanently disposed in fixed relation.

The feed roll structure 119 includes an adjustable carrier 155 consisting of a circular disc 156 having integral with its rear face an extension 157 inset with respect to the edge 158 of disc 156. The extension 157 is of a contour greater than a half circle and less than a full circle thereby providing it with a straight edge 159 and a curved edge 160 of greater length than edge 159. The edge 160 is disposed in concentric spaced relation with respect to the edge 158 of disc 156. The latter is of less thickness than the thickness of the disc 133 of carrier 132. The carrier 155 is formed with an axial opening 161 which extends through disc 156 and extension 157. The disc 156 is formed with a pair of diametrically aligned openings 163. Arranged against the rear face of disc 156 and encompassing the extension 157 is an annular split cam 164 of flat ring-like form having a part of its inner edge bearing against the edge 160 of extension 157. The major portion of the outer edge of cam 164 is flush with the outer edge of disc 156. The split in cam 164 is indicated at 165. The cam 164 is formed of a fixed portion 166 and a resilient portion 167 of less length than the portion 166. The latter is formed with a pair of horizontally aligned spaced openings 168 which register with the openings 163 in disc 156. Extending through the registering openings 163, 168 are holdfast means 169 for fixedly securing the portion 166 to the rear face of disc 156. The resilient portion 167 of cam 164 is spaced from the straight edge 159 of extension 157 whereby a clearance is had for cam portion 167 when the latter is depressed towards the axis of the carrier 155. The cam 164 includes a high part 170 formed on the outer edge of cam portion 167. The high part 170 is of a length to extend from a point removed from the point of mergence of the cam portions 166, 167 to the outer end of one of the edges of the split 165. The high part 170 of the cam 164 is arranged interiorly of the edge 158 of the disc 157 and coacts with the high part 147 of the cam 141 to constitute what may be termed the other one of the grippers for the wire stock when intermittently feeding the latter.

Positioned against the front face of disc 156 is a front circular clamp 171 formed with an axial opening 174 and an opening 172ª which registers with an opening 172ᵇ formed in the carrier 155. Arranged in the registering openings 172ª, 172ᵇ is a holdfast means 172ᶜ for securing carrier 155 and clamp 171 together. Arranged against the rear end of extension 157 and against the front face of wall 109ª of recess 109, is a rear clamp 173, in the form of a circular disc provided with an axial opening 174. The clamp 173 is formed diametrically thereof with an opening 175 intersected by the opening 174. The openings 161 and 174 register with each other. The carrier 155 and clamp 173 are mounted, through the medium of the openings 161 and 174 on that part 176 of shaft 117 which is arranged in the recess 109. The shaft part 176 is formed diametrically thereof with an opening 177 which intersects and registers with the opening 175. Extending through the registering openings 175, 177 is a holdfast means 178 for fixedly securing the clamp 173 and shaft 117 together whereby they will bodily revolve in unison. The part 179 of shaft 117 which projects from recess 109 is reduced and peripherally threaded. The shaft part 179 extends through the opening 172 in the clamp 171. The carrier 155 and clamp 171 are capable of being revolubly adjusted in unison on shaft parts 176, 179. The shaft part 179 carries a clamping nut 180 acting when screwed home to bind clamp 171, carrier 155 and cam 164 against the front face of clamp 173 whereby carrier 155, clamp 171 and cam 164 will bodily revolve in unison with clamp 173 and shaft 117.

The manner of setting up the carrier 155, cam 164 and clamp 171 in relation to each other and in relation to the clamp 173, shaft portions 176, 179 and the clamping screw 180 permits for the adjusting of the high part 170 of cam 164 with respect to the high part 147 of the cam 141 for varying the period of duration of the grip or bite had on the wire stock by the said high parts 147, 170 when intermittently feeding the wire stock whereby the length of that portion of the stock fed through the cutter mechanism to be referred to may be varied. After the carrier 155, cam 164 and clamp 171 have been bodily shifted the desired extent on shaft 117 to adjust the high part 170 relative to high part 147, they are then clamped against clamp 173 by screwing home the clamping nut 180 whereby high part 170 will be secured in its adjusted position.

The disc 158 has its outer face adjacent the clamp 171 provided with suitable graduated indicia 181 for indicating the length of adjustment for the high part 170 of cam 164. The front of the upper wall 182 of the recess 109 has secured thereto a depending outset pointer 183 which associates with the indicia 181.

The cams 141 and 164 are disposed outwardly with respect to the recess 109. The part 97 of the guide 96 has its lower end disposed between, in proximity to, arranged above and spaced from the horizontal centers of the inner sides of the feed roll structures 118, 119. The said part is so arranged as to deliver the wire stock between the cams 141, 164 to be intermittently gripped and pulled by the high parts of said cams to the desired extent on the operation of the structures 118, 119. The said part 97 of guide 96 is arranged forwardly of the upper wall 182 of recess 109.

The wire-feed structure is driven from a gear 184 (Figure 20) revolubly supported on a shaft 185 supported from the back wall 120 of chamber 21 inwardly adjacent to inner side of bushing 124. The gear 184 meshes with gear 128 and drives it in an anti-clockwise direction. The gear 184 is operated in a clockwise direction by the gear 35 carried by shaft 28 which is driven in an anti-clockwise direction by the pulley 31.

The front of the bottom wall 185 of the recess 109 (Figures 63 and 64) is formed with a vertical groove 186 of rectangular cross section, an outwardly opening socket 187 intersecting the groove 186, and a rearwardly extending opening 188 communicating with socket 187 through the base wall of the latter. The front of the top wall 182 of recess 109 (Figures 61 and 62) is formed with a vertical groove 189 of rectangular cross section, an outwardly opening socket 190 intersecting groove 189 and an opening 191 communicating with socket 190 through the base wall of the latter. The guide 96 extends downwardly through groove 189. Arranged within the socket 190 rearwardly of guide 96 (Figure 1) extending through opening 191 and threadedly engaging in the front of structure 13 is a holdfast means 192 for detachably securing top wall 182 of recess 109 to the front of structure 13.

Seated in and extending outwardly from the socket 187 is a holder 193 (Figure 63). The latter is formed of two parts of different outer diameters. The junction of said parts forms holder 193 with a peripheral shoulder 194. The part of larger outer diameter of holder 193 indicated at 195 is interiorly threaded and mounted in socket 187. The part of smallest outer diameter, indicated at 196, forms a socket 197 and an opening 198 which communicates with the socket 197 through the base wall of the latter. The part 196 is arranged in and its opening 197 registers with opening 188 in bottom wall 185. The shoulder 194, when part 195 is mounted in socket 187, abuts the front of wall 185. At the point of mergence of part 196 with part 195, the holder 193 is formed with a pair of superposed spaced aligned openings 200, only one of which is shown (Figure 63).

Seated in the socket 197, extending rearwardly through opening 198 and threadedly engaging in the front of structure 13 is a holdfast means 202 for detachably securing the bottom wall 185 of recess 109 to the structure 13. The holdfast means 202 is arranged rearwardly of the openings 200. Positioned in the groove 186 (Figure 1) and extending through the openings 200 is the vertical upper portion 203 of a depending tubular conductor 204 for the wire stock fed from the wire-feed mechanism 101. The lower portion 205 of conductor 204 is curved inwardly, extends to and has its lower end positioned at the front of a part of the wire-cutter mechanism to be referred to. The upper portion 203 of the conductor 204 aligns with the lower end of guide 96. The conductor 204 is secured to the holder 193 by a set screw 204ᵃ (Figure 63) which engages throughout the threaded inner face of the part 195.

The cutter mechanism generally indicated at 206 and best shown in Figures 1, 21 to 28, 30 and 31, includes a body part 207 formed of an upstanding rectangular portion 208 having upper and lower lengthwise edges 209, 210 respectively and outer and inner side edges 211, 212 respectively. The portion 208 is disposed on its edge 210 and has its rear face formed with a squared rib 213 extending from edge 211 to edge 212 and disposed in proximity to edge 210. The ends of rib 213 are flush with the edges 211, 212. The portion 208 is provided on the rear marginal portion of its edge 209 with a rib 214 lengthwise thereof. The rear side of rib 214 is flush with the rear face of the portion 208. The inner end of rib 214 is flush with the edge 212. The outer end of rib 214 is beveled as at 215 and is spaced inwardly from the edge 211. The portion 208, in proximity to its edge 209 is formed lengthwise thereof with a slot 216 arranged respectively between the vertical median and edge 211 and the longitudinal median and edge 209 thereof.

Integral with the front of the portion 208 is a stationary blade holder 217 in the form of an outwardly directed extension 218 of square cross section, flush with the edges 210, 212, spaced inwardly from the edge 209 and arranged below the longitudinal median of portion 208. The extension 218 is of rectangular contour and is formed with a passage 219 of square cross section extending from the outer to the inner side of the holder. The extension is formed with a vertically disposed screw threaded opening 220 which at its upper end communicates with the passage 219.

Formed integral with the top of the holder 217, spaced from the portion 208, flush with the front of extension 218 and spaced from each side of the latter is a vertically disposed combined confining and guide arm 221 which coacts with the front of portion 208 to form a guide passage 221ᵃ for an element, to be referred to, of mechanism 206. The arm 221 extends above the edge 209 of the portion 208.

Positioned within the passage 219 and extended from each side of the holder 208 is a stationary lower cutter blade 222 which also constitutes a guide for the wire stock. The blade 222 is of square cross section and has a portion of the outer end formed with a concave depression 223 of semi-circular contour in cross section. The depression opens at the outer side 224 of the blade. The blade, centrally of its side 224, is formed with a groove 225 of less depth than said depression 223. The groove 225 extends from the base of the depression 223 to the inner end of the blade, is of semi-oval contour in cross section and forms a guide passage for the wire stock. The wall of depression 223 acts to deflect the outer end of the wire stock into the outer end of the groove 225 when stringing the wire stock for action thereon. The blade is fixedly secured to the holder by a set screw 226 threadedly engaging the wall of opening 220 and binding against the blade.

Slidably mounted with relation to the body part 207 and arm 221 is a vertically movable spring controlled cutter blade carrier 227 formed of a vertical part 228 having its front provided with a pair of spaced parallel vetically disposed ribs 229, 230 flush with its sides. The part 228 is arranged on the guide passage 221ª. When carrier 227 is mounted with relation to body part 207 and the arm 221 the latter is arranged between the ribs 229, 230. The lower portion of part 228 is formed with a socket 231 opening at the lower end of such part. Mounted on the holder 217 and extending into the socket 231 is a controlling spring 232 for the carrier 227. The upper end of the part 228 of the carrier is formed with a rearwardly directed arm 233 disposed at right angles thereto.

The movable cutter blade is indicated at 234 and is normally arranged above and coacts with the inner end of blade 222 for cutting the wire stock. The rear marginal portion of the rear side of the carrier 227 is rabbeted throughout, as at 235, to an extent whereby the rear portion 236 of the carrier will be flush with edge 212 of the body part 207 and its forward portion 237 will be outset with respect to the said edge 212. The rear side of the said forward portion 237, for the major part of the length of its outer face is rabbeted as at 238 to form transversely of such face a shoulder 239 in proximity to the top of the carrier. The blade 234 is positioned against the rabbeted portion 238, depends from the latter, abuts shoulder 239, and is secured to the carrier by a holdfast means 240 extending therethrough and engaging in portion 237.

The mechanism 206 includes an operating means 241 for the blade 234. The said means acts on the arm 231 of the carrier to depress the latter whereby blade 234 is carried therewith and coacts with blade 222 for cutting off a portion of the wire stock. The said means 241 is actuated from the staple-former mechanism as the latter initially moves to active position with respect to the forming of the staple. The said means 241 is arranged in a cutout 242 formed in the rear face of the lower inner portion of the support 102 of the wire-feed mechanism. The cut-out 242 opens at the bottom and at the inner side edge of support 102 (Figure 31). The extension 22 coacts with the cut-out 242 to provide a chamber 243 which opens throughout its inner side as at 244 and has a part of its bottom wall open as at 245. The means 241 includes an upstanding bell crank lever 246 mounted on a pivot 247 secured to extension 22 and support 102. The lever includes vertical and horizontal arms 248, 249 respectively. The arm 248 is of greater length than arm 249. The latter extends over the opening 245 in the bottom wall of chamber 243. The arm 248 is arranged in proximity to the open side 244 of chamber 245 and is provided at its upper end with a rearwardly extending shaft 250 upon which is revolubly mounted a roller 251 normally disposed in the path of a cam 252, carried by and extended laterally from one side of the stapleformer mechanism 253. The came 252 is seated in a mortise 254 (Figures 41, 42) formed in the mechanism 253. The cam 252 is anchored to mechanism 253 by a pair of dowels 255 and a screw 256. The cam 252 is arranged between the transverse median and lower end of mechanism 253 and on the start of the operation of the latter it wipes the roller 251 and thereby rock lever 246 on its pivot in a direction to lower lever arm 249. The latter has adjustably connected thereto and depending therefrom a pusher 257 which seats on the arm 233 of the movable blade carrier 227. The normal position of lever 246 is as shown in Figure 31. The spring 232 acts to maintain lever 246 in and to restore the latter to its normal position. When the arm 249 of lever 246 is lowered, it provides for the pusher 257, acting on arm 233 of carrier 227, to an extent whereby the carrier 227 will be depressed carrying blade 234 therewith for the purpose of the latter coacting with the blade 22 to sever that portion of the wire stock from which the staple is formed.

The extension 22 (Figure 31) of the supporting structure 13 is formed in proximity to its bottom edge 258 with a transverse groove 259; a vertical notch 260 opening at edge 258 and into which the inner end of groove 259 opens; and a vertical notch 261 opening at edge 258 and spaced from notch 260. The purpose of notch 261 is to provide a clearance for an anvil element to be referred to. The body part 207 of the cutter mechanism 206 is positioned against the front of extension 22, below the support 102 and when so positioned the rib 213 is seated in groove 259 and abuts the side edge 262 of the notch 260. The mechanism 206 is adjustable relative to the mechanism 253 and extension 22 to provide for the severed portion of the wire stock to be of the necessary length whereby when formed into a staple the legs of the latter will be of uniform length. The normal or initial position of the mechanism 206 is when the rib 213 abuts the side edge 262 of notch 260. The body part 207 of mechanism 206 is detachably secured to the extension 22 by a headed screw 263 which extends through the slot 216 and engages with the wall of a threaded opening 264 formed in the extension 22. The said body part 207 is slidably connected to extension 22 to permit of said body part being adjusted from and towards the side edge 262 of notch 259 to vary the length of the severed portion of the wire stock. The slot 216 and screw 263 provide for the adjusting of body part 207 and for securing the latter in its adjusted position. The support 102 above the slot 216 is provided with indicia 265 for indicating adjustments relative to mechanism 206. The beveled end 215 of rib 214 constitutes a pointer for selective coaction with the adjustment indicators of the indicia 265. The end 215 of the rib 214 is visible from the front of the machine.

Secured to the front of the extension 22, in parallel spaced relation with the inner squared part 103 of the structure 102, is a vertically disposed bar 266, of greater length than and which is disposed in depending relation with respect to the lower end of the said part 103. The bar 266 constitutes a guide section and coacts with the part 103 to form the front of extension 22 with a guide passage 267, which is common to the staple former and driver mechanisms and opens intermediate its ends in to the chamber 21. The bar 266 is formed with spaced vertically aligned openings 268 for the passage of holdfast means 269 which engage in the extension 22 for anchoring bar 266 onto the front of the structure 13. Below the upper opening 268 the bar 266 is formed with a threaded opening 270 and below the lower opening 268 bar 266 is provided with a threaded opening 271.

The machine includes a vertically disposed front plate 272 best shown in Figures 1 and 29 and which has its upper end flush with the upper ends of the part 103 of support 102 and the bar 266 secured to the front of structure 13. The plate 272 depends below the lower end of the part 103 of support 102 and has its lower end flush with the lower end of bar 266. The lower end of the latter is arranged above and in proximity to the bottom edge of extension 22. The plate 272 is secured to the front of part 103 and bar 266 by holdfast means 273 extending therethrough the plate and engaging with the walls of the openings 106, 107, 270, 271 and in the front of the structure 13. The side edges of the plate 272 are flush with the outer side edges of the part 103 and bar 266. The plate 272 is formed with an enlargement 274 on its front lengthwise thereof; and a cut-out to form a clearance 277. The enlargement 274 is disposed centrally and lengthwise of the front of plate 272 and extends upwardly from the upper wall of slot 275 to a point spaced from the top edge of the plate. The clearance 277 at its upper end opens into the slot 275 through the bottom wall of the latter. The clearance 277 is disposed centrally and lengthwise of plate 272 and extends from the bottom wall of slot 275 to the lower end of the plate. The enlargement 274 is formed lengthwise thereof with a vertical socket 278 closed at its upper end and having its mouth 279 at its lower end. The mouth of socket 278 opens into the clearance 277 through the upper wall of the cut-out. Arranged within the lower portion of socket 278 is a vertical guide sleeve 280 of less length than and having its lower end normally flush with the edge of the mouth of socket 278. The front of the enlargement 274, at the lower end of the latter is provided with a lateral extension 281. The enlargement 274 is formed with a threaded opening 282 disposed at right angles to the socket 278. The opening 282 extends from the outer face of the extension 281 to and opens into the socket 278. Mounted in the opening 282 is a peripherally threaded removable holdfast means 283 (Figure 29) which binds against the sleeve 280 for fixing it stationary within the socket 278. The plate 272 bears against the front of the staple-driver mechanism 253.

The machine includes a spring controlled hanger structure 284 for a pivotally suspended spring controlled anvil element 285. The structure 284 is best shown in Figures 29 and 31 to 35 and is slidably connected with the plate 272. The structure 284 includes a vertically disposed suspended hanger member 286 for the anvil element. The member 286 extends through the clearance 277 and is vertically slidable against the lower portion of the front face of the staple-driver mechanism, to be referred to. The lower end portion of member 286 is bifurcated as at 287. The member 286 at its front is integral with the inner wall 288 of a vertical housing 289 having a closed upper end 290 provided with an inwardly extending coupling lip 291, disposed over and spaced from the upper end of member 286. The lower portion of the inner wall 288 of the housing 289 is cut out to form a continuation of the furcation in the member 286. The side walls of the housing 289 are indicated at 292 and the front wall at 293. The lower portion of the front wall 293 is bifurcated, as at 294. The furcation in the member 286 and in the walls 288, 293 provide clearances for the anvil element 285 when the latter is downwardly tilted by the staple-driver mechanism from its normal position and when it returns to its normal position. The housing 289 is vertically movable and is arranged on front of the plate 272 between a pair of strip-like vertical confiners 295, disposed in parallel spaced relation and seated against spaced parallel outset portions 296 on the front of plate 272 bordering the side edges of the clearance 277. The portions 296 extend from the lower wall of clearance 277 to the lower end of plate 272. The confiners 295 are of less length than and are flush at their lower ends with the lower ends of the portions 296. The upper ends of the confiners 295 constitute stops for a purpose to be referred to. The upper end of housing 289 is permanently arranged above the upper ends of the confiners 295. The confiners 295 overlap the side edges of the clearance 277. The housing 289 is slidably connected with the front of plate 272 and for such purpose the outer faces of the side walls 292 thereof are formed end to end with lengthwise grooves 297 into which extend the inner sides of the confiners 295.

The structure 284 includes a spring controlled suspension 298 for the housing 289 and which consists of a vertically disposed plunger rod 299 formed at its lower end with a head 300, provided with a groove 301 in its front face. The lip 291 extends into the groove 301 whereby housing 289 and head 300 are coupled together. The rod 299 extends downwardly through sleeve 280. The lip 291, when extended into the groove 301, holds the head 300 against the upper end of the member 286. The upper end of rod 299 is peripherally threaded as at 302 and adjustably engaging with said threads is a spring tensioning nut 303. Surrounding the rod 299 and interposed between nut 303 and the upper end of sleeve 280 is a suspension spring 304 for the structure 284. The normal or initial position of the structure 284 is as shown in Figure 34. The downward movement of the housing 289 is arrested by a stop bar 305 which is disposed transversely of the housing in proximity to the upper end. The bar 305 extends laterally from the side walls 292 of the housing. The upper ends of the confiners 295 are arranged in the path of and coact with the extended portions of bar 305 to limit the lowering movement of the housing.

The machine includes a controlling structure 306 functioning as a spring controlled abutment for the anvil element 285 when the latter is tilted by the staple-driver mechanism from its normal or initial position and a means for returning said element to the position aforesaid. The structure 306 is arranged within and extends from the lower end of housing 289 and permanently bears against the anvil element 285. The structure 306 is best shown in Figures 32 to 35 and it consists of a vertically disposed coiled spring 307, a plunger 308 and a retaining pin 309 (Figure 65). The spring 307 is arranged within and abuts the upper end 290 of the housing 289. The plunger 308 is slidably mounted in the lower portion of housing 289 and bears against the spring 307. The plunger 308 is capable of having its lower portion extended from the open lower end 310 of housing 289. The plunger 308 is grooved as at 311 and extending through said groove is the retaining pin 309 therefor. The latter is secured in the front and inner walls of housing 289. The outer or lower end of the plunger 308 permanently seats on the anvil element and constitutes a spring controlled abutment for such element. The spring 307 and plunger 308 coact as a means for returning the anvil element to its initial or normal position.

The anvil element 285 consists of an upstanding front portion 312 of semi-oval contour, an upstanding rear portion 313 of tapered contour and a vertical stem or arm 314 integral with the rear part of the straight top edge 315 of portion 312. The front and bottom edges 316, 317 of the portion 312 are curved. That part of the portion 312 disposed in outwardly extended relation with respect to the stem 314 is termed a nose for slidably engaging the lower end of plunger 308 when element 285 is tilted from its normal or initial position by the driver mechanism. The portion 313 has curved lower and rear edges 318, 318ᵃ respectively which merge into each other. The edge 318 merges into the curved edge 317 of portion 312. The portion 313 is of less height that the portion 312 and the rear edge 319 of the latter is disposed above the portion 313. The said edge 319 inclines rearwardly from its upper to its lower end. The portion 313 has formed in and transversely of its top a V-shaped notch, groove or trough 320, one wall of which forms a downward continuation of the edge 319 of portion 312. The portion 313 is provided with a top edge 321 which inclines upwardly from the outer end of the other wall of notch 320 to the upper end of the edge 318. The edge 321 constitutes a discharge conducting surface for the formed staple, when the anvil element 285 is tilted downwardly by the staple-driver mechanism as shown in Figure 35. The stem 314 is arranged in the furcation at the lower end of the member 286 of mechanism 284 and in proximity to its upper end is formed with an opening 322. Extending through the opening 322 is a pivot pin 323 upon which element 285 pivots. The pin 323 is carried by the member 286 and extends across the furcation in the latter. The stem 314 on the lower portion of its rear side edge 324 has extended rearwardly therefrom a laterally disposed nose 325 having a rearwardly extending downwardly inclined rear edge and a rearwardly directed squared bottom edge. The nose is of beveled form and of substantially triangular contour. The rear edge of nose 325 is arranged in the path of the lower end of the staple-driver mechanism. When the element 285 is in its normal or initial position the notch 320 thereof aligns with the groove 225 formed in the stationary cutter blade 222 of the cutter mechanism for the passage of that portion of the stock which is severed.

The staple-former mechanism 253 is arranged against the front of the structure 13 and extends across the inner side of the open front of the chamber 21. The staple-driver mechanism, indicated at 336 is positioned on the front of the mechanism 253. The mechanisms 253, 336 constitute what may be termed a combined staple-former and driver assembly as they are connected together in slidable relation. The assembly is slidably mounted in the guide passage 267.

The mechanism 253 consists of a vertically disposed flat bar 337 of rectangular contour in transverse cross section. The bar 337 is of suitable length, width and thickness and is formed lengthwise thereof and intermediate its ends with a rectangular cut-out 338 opening at the side edge of said bar which opposes the inner side edge of bar 266. The side edges of bar 337 in proximity to their lower ends are provided with oppositely disposed transverse grooves 339 in which are secured by the holdfast devices 340, a pair of shanks 341 carrying a pair of outwardly directed upstanding spaced parallel staple forming jaws 342 of greater height than and depending below and extending above the shanks 341. The jaws 342 also extend outwardly from and depend below the lower end of bar 337. The rear lower corner of the latter is beveled as at 343. The lower end edges of the jaws 342 are formed with inverted parallel V-shaped wire receiving notches 344. The inner faces of the jaws 342 in proximity to their outer lengthwise edges of said jaws are formed with parallel grooves 345 extending from the lower to the upper ends of said jaws. The bar 337 has formed therein between its lengthwise median and that edge thereof which the cut-out 338 with an opening 346 for a purpose to be referred to. The opening 346 is arranged adjacent to the upper end of the cut-out 338.

The staple-driver mechanism 336 is positioned against the front of the bar 337 and extends between the jaws 342 of the mechanism 253. The mechanism 336 includes a flat bar 347 of less length than, but of the same width and thickness as bar 337. The bar 347 has the front face of its lower en terminal portion formed with a T-shaped recess 348 opening at the side and bottom edges thereof. Fixed to the bar 347 and aligning with the opening 346 in the bar 337 is a rearwardly extending shaft 349 which passes through the cut-out 338 to beyond the bar 337. The shaft 349, intermediate its ends, has integral therewith an enlarged boss 350 of a contour greater than a half circle and less than a complete circle to form it with a flat side 351 which is in registry with the open side of the cut-out 338. The boss 350 at the outer part of its other or rounded side is rabbeted to form a pair of flat facets 353, 354 (Figure 40) disposed at right angles to each other. The facet 353 bears against the close side of cut-out 338. The facet 354 bears against the rear face of bar 337. The rabbeted boss 350 provides for slidably connecting the bars 337, 347 together.

The mechanism 336 includes a reversible driver element 355, best shown in Figure 50 consisting of an oblong bar 356 of squared contour in transverse cross section. The bar 356 centrally and transversely of its rear face 357 is formed with a groove 358. The bar 356 is provided with an opening 359 extending from its front face 360 and opening into groove 358 centrally of the base wall 361 of the latter. The side edges 362 of bar 356, in proximity to the said face 360 are formed lengthwise thereof with oppositely disposed laterally extended ribs 363 (Figure 44) which slidably engage in the grooves 345 of the jaws 342 of the mechanism 253. When the latter is arranged relative to the mechanism 336, the element 355 is positioned between the jaws 342. The element 355 has its end edges 364 of like form. The upper and lower front corners of the bar 356 are rabbeted, as at 364 and beveled, as at 364ᵃ (Figure 51) and by this arrangement it provides whereby when one end of element 355 becomes worn the other end may be substituted. The rabbeted and beveled front corners each provides for the element 355 to have a broad point of contact with the anvil element 285 when the latter is tilted downwardly by element 355. The latter is detachably connected to the bar 347 by a resilient T-shaped upstanding latching member 365 best shown by Figure 49. The member 365 includes a head 366 and a stem 367. The head 366 is formed centrally thereof with a threaded opening 368 which registers with an opening 369 (Figures 32 to 35 and Figure 43) formed in the bar 347. The lower terminal portion 370 of stem 367 is of greater thickness than the remaining portion 371 of the stem. The portion 370 gradually decreases in thickness from its upper to its lower end and has its upper end disposed forwardly with respect to the front face of portion 371 to provide the front of stem 367 adjacent its lower end wtih a transversely extending shoulder 372. The rear face 373 of the stem portion 370 inclines forwardly from tis lower to its upper end. The lower end of stem 367 is pointed as at 374. The head 366 is seated in the horizontal portion of the recess 348. The stem 367 is arranged within and depends from the lower end of the vertical portion of the recess 348. The head 366 is secured to the bar 347 by a countersunk holdfast means 375 (Figures 32 to 35) engaging in the registering openings 368, 369.

The driver element 355 is of less thickness than and is detachably connected to the bar 347 by the shoulder 372 of member 365 being extended into the groove 358 and abutting one of the side walls 376 of the latter and in this connection attention is directed to Figure 32. That wall 376 of groove 358 engaged by the shoulder 372 is termed a keeper for the latching member. The opening 359 in element 355 is provided for the passage of a suitable instrument to shift the latching member free of its keeper to permit of the removing of the driver element for reversing the latter or for subsituting a new one. The driver element when removed is shifted downwardly between and from the jaws 342 of mechanism 253.

The machine includes an operating mechanism 377 which is common to the mechanisms 253 and 336. The mechanism 377 is driven from the shaft 28 and it includes a circular disc 378 secured to the front end of the shaft 28 forwardly of the gear 35. The disc 378 is provided eccentrically thereof a pin 379 having pivotally mounted thereon the inner ends 380, 381 of a pair of oppositely extending outwardly directed links 382, 383 respectively. The outer end 384 of link 382 is pivotally mounted on a stub shaft 385 which is anchored in the opening 346 formed in and projects rearwardly from bar 337. The outer end 386 of the link 383 is pivotally mounted on the rear end of shaft 349, carried by bar 347. The link 382 operates the staple-former mechanism 253. The link 383 operates the staple-driver mechanism 336.

With reference to Figure 46 it shows the normal or initial position of the mechanism 377 with respect to the staple-former and staple-driver mechanisms and when in such position the distance between the axis of shaft 28 and shaft 385 is indicated by the dimension line A, and the distance between the axis of shaft 28 and the axis of shaft 349 is indicated by the dimension line B. The distance indicated by the line A is greater than that indicated by line B. With reference to Figure 47 it shows the position of the mechanism 377, with respect to the staple-former and staple-driver mechanisms after the mechanism 377 has been operated in an anti-clockwise direction for a quarter revolution, and when in such position the distance between the axis of shaft 28 and the axes of shafts 385, 349 will be the same as indicated by the dimension lines A', B'. With reference to Figure 48 it shows the position of the mechanism 377 with respect to the staple-former and staple-driver mechanisms after the mechanism 377 has been operated in an anti-clockwise direction for a half revolution and when in such position the distance between the axis of shaft 28 and the axis of shaft 385 is indicated by the dimension line $A^2$, and the distance between the axis of shaft 28 and the axis of shaft 349 is indicated by the dimension line $B^2$. The distance indicated by the line $A^2$ is less than the distance indicated by the line $B^2$. The distance between the axes of the shafts 385, 349 is the same in the initial position and at the completion of a half revolution of the mechanism 377 as indicated by the dimension lines C, $C^2$. On the first quarter revolution of mechanism 377 the axes of the shafts 385, 349 approach each other as indicated by the dimension line C'.

The mechanism 377 provides for a differential movement of the staple-former and driver mechanisms 253, 336 respectively with respect to each other. On the movement of the mechanism 377 for first quarter revolution anti-clockwise, the mechanism 253, 336 will move in the same direction but mechanism 253 will have a quicker movement than mechanism 336 whereby on the completion of such stage the axes of the shafts 349, 385 will be spaced equi-distance from the axis of shaft 28. On the movement of the mechanism 377 for an additional quarter revolution, after the completion of the first quarter revolution the mechanisms 253, 336 will move in the same direction but the movement of the mechanism 336 will be quicker than the movement of the mechanism 253 whereby at the completion of the second quarter revolution, the axis of the shaft 349 will be spaced a greater distance from the axis of shaft 28, than the distance between the axis of the latter and the axis of shaft 385. When mechanism 377 is operated in an anti-clockwise direction for the first half of its revolution, the mechanisms 253, 366 are shifted downwardly thereby and on the second half of the revolution of mechanism 377 the mechanisms 253, 366 are moved upwardly thereby. The first differential is for the purpose to have mechanism 253 perform its function prior to the staple driving performed by the mechanism 366, but with the mechanisms 253, 366 travelling downwardly in the same direction. The second differential is for the purpose to have the mechanism 366 perform its function after the mechanism 253 has acted and with said mechanisms moving in the same direction.

The machine includes a coupling structure 387 for connecting with the head 5, an adjustable combined work support and staple clinching structure 388 in overhanging relation with respect to base 2.

The structure 387 includes a combined clamping and suspension bracket 389 for the structure 388. The bracket 389 is formed at its rear with a pair of oppositely disposed laterally extending apertured ears 390. The rear face of the bracket is arranged against the inset 8. The ears 390 are positioned against the lugs 9. The bottom of bracket 389, at its rear, is seated on the top of standard 3. The bracket 389 is secured to head 5, in extended relation by holdfast means 391 extending through and connected respectively to the ears 390 and lugs 9. The bracket 389 is formed with an upstanding circular opening 392 extending from its bottom to its top and an outwardly directed passage 393 opening at the top, bottom and front of the bracket. The passage 393 communicates at its rear end with the opening 392. The width of the passage 393 is less than the diameter of the opening 392. The latter in connection with the passage 393 forms the bracket 389 with a pair of spaced parallel clamping jaws 394, 395. The jaw 395 in proximity to its lower end is provided with a transverse opening 396, which endwise aligns with a countersunk opening 397 formed in the lower portion of the jaw 394. There is associated with the jaws 394, 395 a clamping device 398 including a bolt 399 having a head 400 and a threaded shank 401, and a clamping nut 402 provided with a lever arm 403. The head 400 is mounted in the countersunk portion of opening 397. The shank 401 extends through openings 397, 396 and projects outwardly from the latter. The nut 402 threadedly engages with the projecting portion of shank 401 and has its inner face provided with an annular boss 404 for bearing against the outer face of jaw 395. Secured against the bottom edges of bracket 389 and having portions partly closing the bottom of opening 392 and passage 393 is a pair of oppositely disposed spaced aligned suspension plates 405 of like form. Each of said plates has its inner edge, centrally thereof formed with a semicircular cut-out 406. The cut-outs 406 coact to provide a split circular opening for a purpose to be referred to. The holdfast means, indicated at 407, secures the plates 405 to the jaws 394, 395.

The combined work support and staple clinching structure 388 consists of a staple-clincher supporting member 408 formed of a pair of anchored together sections 409, 410. The section 409 is in the form of a bar of the desired length, width and thickness. The section 409 is disposed on its lower lengthwise edge 411. The inner and outer end edges of section 409 are indicated at 412, 413 respectively and the upper lengthwise edge of such section at 414. The edge 414 is flat and horizontally disposed. The section 409 has its edge 414 formed with a transverse groove 415 in proximity to end edge 413. The section 409 is formed lengthwise thereof with a pair of spaced parallel threaded sockets 416, 417 arranged in proximity to the edges 411, 414 respectively and opening at the edge 412. The section 409 is also provided lengthwise thereof with a socket 418 arranged between the sockets 416, 417 and opening at edge 412.

The section 410 is in the form of a vertically disposed rod of circular cross section, of greater length than the width of and of greater diameter than the thickness of section 409. The front of section 410 is formed with a groove 419 extending from the upper to the lower end of the rod. The section 410 is provided with a pair of superposed countersunk spaced parallel openings 420, 421 extending diametrically thereof from the rear of the rod and communicating with the groove 419 through the base wall of the latter. The section 410 is also formed with a diametrically disposed socket 422 opening at the base wall of groove 419. The section 410 has its top flush with the edge 414 of section 409. The section 410 is disposed in depending relation with respect to the edge 411 of section 409. The rear of the latter is positioned in the groove 419 in a manner to align sockets 416, 417 with the openings 420, 421 and the socket 418 with the socket 422. Extending from the latter is a dowel pin 423 which engages in the socket 418. The socket 422 is of less length than the socket 418. Extending through and countersunk in the openings 420, 421, as well as threadedly engaging with the walls of the sockets 416, 417 are holdfast means 424. The sockets 416, 417 and openings 420, 421 in connection with the holdfast means 42 anchor the sections 409, 410 of the member 408 together in abutting relation. The inner terminal portion of section 409 is arranged in the passage 393. The section 410 is positioned in the opening 392 and is of less height than bracket 389.

The structure 388 includes a means 425 for vertically adjusting the member 408. The means 425 includes an upstanding internally threaded adjusting sleeve 426 formed of two different outer diameters. The part 427 of sleeve 426 of smallest outer diameter is arranged above the part 428 of greatest outer diameter. The part 427, in proximity to its upper end is formed with an annular peripheral groove 429. The sleeve 426 has its upper end arranged in the lower part of opening 392 and it is revolubly suspended from and fixed from vertical movement with respect to the bracket 389 by the edges of the cut-outs 406 of the plates 405 engaging in the groove 429. Threadedly engaging in and extending through the sleeve 426 is a vertically movable screw 430, for bearing against the lower end of section 410 of member 408 for the purpose of vertically adjusting the latter on the revolving of sleeve 426. The member 408 is retained in its adjusted position by the screw 430 coacting with the releasable clamping device 398.

The structure 388 includes a staple clinching member 431 which is arranged within and extends above the groove 415 formed in section 409. The member 431 is in the form of a block of metal having its top formed transversely thereof with a pair of spaced parallel grooves 432. The member 431 is secured in the groove 415 by a binding screw 433 carried by the section 409 of member 408. The sides of member 431 preferably will be flush with the sides of the section 409.

The operation of the feed, cutter, former and driver mechanisms are so timed so the feed mechanism will perform its wire stock feeding function in advance of the operation of the cutter mechanism, so the latter will be operated to sever that portion of the wire stock disposed transversely of and in laterally extended relation with respect to the anvil element as the staple-former mechanism moves downwardly to perform its function on the severed stock and so the staple-driver mechanism will move downwardly with the staple former mechanism, but will not perform its driving function until after the staple-former mechanism has acted. The staple-driver mechanism will act as it moves downwardly to tilt the rear of the anvil element downwardly after the staple has been formed on the latter, clear the formed staple from the anvil element and then drive the staple through the work. The latter is positioned on the structure 388 over the clinching member 431. The driver mechanism drives the formed staple through the work against the clinching member 431 whereby the legs of the staple will be upset and the staple clinched to the work. Before the former mechanism functions to provide the staple it acts to grip the wire stock against the anvil to hold the stock against movement before it is severed by the cutter mechanism, this prevents displacement of that portion of the stock from which the staple is formed.

The anvil element is what may be termed a combined anvil and supporting means for the wire stock and for the staple formed on the latter. The hanger structure 284 for the notched anvil element holds the latter up to a determined wire line while the wire is fed across the said element. Then the former-mechanism jaws grip the wire which centers in the notch of the anvil. When the wire is held by the former-mechanism jaws against the bottom of the notch in the anvil, the wire at this time has not been formed into a staple is then cut off by the cutter mechanism. The severed wire is held between said jaws and the bottom of the notch in the anvil, and the latter and structure 284 then travels downwardly about one eighth of an inch due to the action of the former-mechanism and through the yielding of the return spring of the plunger rod 299 of the hanger structure 284. This gives the wire an opportunity to seat itself correctly and prevent it from jumping out of the anvil which is generally the case and thus prevent ultimate formed staples having even legs. After the completion of the one-eighth of an inch downward travel of the anvil and structure 284, the latter stops at a predetermined position, and only then at this point does the form-mechanism act to bend the wire over the anvil and completes its forming function to provide the staple. After the latter is formed the driver-mechanism acts to tilt the rear of the anvil against the action of the spring 306 and the plunger 308. After the driver-mechanism has tilted the anvil, removed the formed staple from off of the latter and driven the staple through the work such mechanism moves upwardly clear of the anvil and the spring 306 and plunger 308 will act to return the anvil to its normal or initial position as shown in Figure 32. The staple driver member or element of the driver-mechanism operates between the jaws of the former-mechanism and initially tilts the anvil by wiping contact with the nose 325 on arm 314 whereby the staple will be caused to pass out of notch 320 onto the edge 321 rearwardly of the lower front corner of the driver element, the latter as it continues to move downwardly will force the staple from off of the anvil and drive the staple into the work.

The sleeve 280 is vertically adjustable within the socket 278 and forms an element of the structure 284. The adjustment of the sleeve 280 with respect to the nut 333 on the plunger rod 299 is for the purpose of setting the wire line in relation to the anvil and the stationary cutter 222. The latter is removably secured in the passage 219 to permit of the employment of stationary cutters having grooves for receiving different gages of wire stock.

The wire stock is conducted from the wire-feed mechanism to the cutter mechanism, enters the latter at the outer end of the groove of the stationary cutter and discharges from the cutter mechanism at the inner end of the groove of said stationary cutter to pass over the anvil element.

The wire stock is intermittently fed in the desired length over the anvil element and between the intermittent feeds the length of stock over the anvil element is severed. The machine is intermittently operated by the coaction of the clutching mechanism with the operating shaft 28.

What I claim is:

1. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter-mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to form the staple in advance of making active the staple driver to tilt said element and drive the staple, said staple former including means to provide for the operation of the cutter-mechanism to sever the stock prior to the formation of the staple, and an intermittently operable automatically controlled operating means common to said feed-mechanism and moving means for said assembly.

2. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter-mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to successively grip the latter to said element and form the staple in advance of making active the staple driver to tilt said element and drive the staple, said staple former including means to provide for the operation of the cutter-mechanism to sever the gripped stock prior to the formation of the staple, and an intermittently operable automatically controlled operating means common to said feed-mechanism and moving means for said assembly.

3. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter-mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to form the staple in advance of making active the staple driver to tilt said element and drive the staple, said staple former including means to provide for the operation of the cutter mechanism to sever the stock prior to the formation of the staple, an intermittently operable automatically controlled operating means common to said feed-mechanism and moving means for said assembly, and an adjustable combined work support and staple clinching structure arranged below said anvil.

4. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter-mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to form the staple in advance of making active the staple driver to tilt said element and drive the staple, said staple former including means to provide for the operation of the cutter-mechanism to sever the stock prior to the formation of the staple, an intermittently operable automatically controlled operating means common to said feed-mechanism and moving means for said assembly, said feed-mechanism including means for adjusting one of the said coacting parts thereof for varying the extent of the feed of the stock, and said cutter-mechanism including means for adjusting the position of said stationary blade relative to the anvil element to dispose the stock over the anvil element in uniform laterally extended relation with respect to the sides of said element.

5. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter-mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to form the staple in advance of making active the staple driver to tilt said element and drive the staple, said staple former including means to provide for the operation of the cutter-mechanism to sever the stock prior to the formation of the staple, an intermittently operating means common to said feed-mechanism and moving means for the assembly, and a revoluble normally stationary releasable clutch-mechanism for intermittently clutching said operating means to a prime mover and including coacting parts for automatically discontinuing its clutching function at the end of one revolution thereof and for releasable latching it from movement.

6. In a machine for forming and driving staples, a wire stock cutter-mechanism including a stationary combined stock guide and cutter blade and an intermittently operable cutter blade coacting with the stationary blade for severing off a portion of the stock, a pivoted spring controlled tiltable anvil element arranged adjacent to said stationary blade for supporting that portion of the stock which is to be severed and from which the staple is formed, a spring controlled hanger for pivotally suspending said element and including means for varying the position of the stock line with respect to said element, a stock feed-mechanism including intermittently coacting parts for feeding a length of the stock through said stationary blade and across said element, a vertically movable assembly arranged over said element and including a staple former and a staple driver operating through said former, means common to the staple former and driver for moving them simultaneously in a like direction and for imparting a differential movement thereto to make the former active on the stock to form the staple in advance of making active the driver to tilt the anvil and drive the staple, said former including means to provide for the coaction of said blades to sever the stock prior to the formation of the staple, and an intermittently operable automatically controlled operating means common to said feed mechanism and moving means for said assembly.

7. In a machine for forming and driving staples, a pivoted spring controlled tiltable anvil element for supporting a length of wire stock which is to be severed and from which the staple is formed, an intermittently operable wire stock cutter-mechanism arranged adjacent to said anvil element and including means for guiding the said length of the stock over said element, a spring controlled hanger for pivotally suspending said element and including means for varying the position of the stock line with respect to said element, a wire stock feed-mechanism including intermittently coacting parts for feeding a length of the stock through said cutter mechanism and across said element, a vertically movable assembly arranged over said element and including a staple former and a staple driver operating through the staple former, means common to said staple former and staple driver for moving them simultaneously in a like direction and for imparting a differential movement thereto to make the staple former active on the stock to form the staple in advance of making active the staple driver to tilt said element and drive the staple, said staple former including means to provide for the operation of the cutter-mechanism to sever the stock prior to the formation of the staple, an intermittently operable automatically controlled operating means common to said feed-mechanism and moving means for said assembly, and a spring controlled wire stock check and guide structure arranged over and opening into said feed mechanism.

8. In a machine for forming and driving staples, a wire stock cutter-mechanism including a stationary combined stock guide and cutter blade and an intermittently operable cutter blade coacting with the stationary blade for severing off a portion of the stock, a pivoted spring controlled tiltable anvil element arranged adjacent to said stationary blade for supporting that portion of the stock which is to be severed and from which the staple is formed, a spring controlled hanger for pivotally suspending said element and including means for varying the position of the stock line with respect to said element, a stock feed-mechanism including intermittently coacting parts for feeding a length of the stock through said stationary blade and across said element, a vertically movable assembly arranged over said element and including a staple former and a staple driver operating through said former, means common to the staple former and driver for moving them simultaneously in a like direction and for imparting a differential movement thereto to make the former active on the stock to form the staple in advance of making active the driver to tilt the anvil and drive the staple, said former including means to provide for the coaction of said blades to sever the stock prior to the formation of the staple, an intermittently operable automatically controlled operating means common to said feed-mechanism and moving means for said assembly, and a spring controlled wire stock check and guide structure arranged over and opening into said feed structure.

9. In a machine for forming and driving staples, a detachable front plate, a vertically movable hanger structure for pivotally suspending a tiltable anvil element, said structure and plate having coacting parts above their lower ends for connecting them together in slidable relation, said structure including a part carried by the other part thereof and coacting with the said part of said plate for resiliently supporting said structure in suspendable relation with respect to said plate, and spring controlled means encompassed by the front portion of and depending from said structure providing a resilient abutment and return means for the tiltable anvil.

10. In a machine for forming and driving staples, a wire stock cutter-mechanism including a stationary combined stock guide and cutter blade and an intermittently operable cutter blade coacting with the stationary blade for severing off a portion of the stock, a pivoted spring controlled tiltable anvil element arranged adjacent to said stationary blade for supporting that portion of the stock which is to be severed and from which the staple is formed, a spring controlled hanger for pivotally suspending said element and including means for varying the position of the stock line with respect to said element, a stock feed-mechanism including intermittently coacting parts for feeding a length of the stock through said stationary blade and across said element, a vertically movable assembly arranged over said element and including a staple former and a staple driver operating through said former, means common to the staple former and driver for moving them simultaneously in a like direction and for imparting a differential movement thereto to make the former active on the stock to form the staple in advance of making active the driver to tilt the anvil and drive the staple, said former including means to provide for the coaction of said blades to sever the stock prior to the formation of the staple, an intermittently operable automatically controlled operating means common to said feed mechanism and moving means for said assembly, and an adjustable combined work support and staple clinching structure arranged below said anvil.

11. In a machine for forming and driving a wire staple, a wire stock cutter-mechanism including a horizontally adjustable body part formed with an extension having releasably secured therein and extended therefrom a combined wire guide and stationary cutter blade, said mechanism including a combined confining and guide arm integral with said extension and forming in connection with the latter and said body part a guide passage, an intermittently operable vertically movable spring controlled carrier slidably mounted in said guide passage, a vertically movable cutter blade for coaction with said stationary blade to sever the wire and being secured to said carrier, and a rib on the top surface of said body part and having a beveled end constituting a pointer adapted for selective coaction with adjusting indications for said body part.

12. In a machine for forming and driving staples, a wire cutter mechanism including a stationary cutter and a vertically movable spring controlled cutter means coacting with the other cutter to sever the wire, a pivotally supported actuating means for shifting the movable cutter means to coacting relation with the stationary cutter, a vertically movable assembly formed of a staple former and a staple driver positioned forwardly of the staple former and including a detachable staple driving element, said staple former element including a pair of forwardly extending spaced parallel staple forming jaws, said driving element operating between said jaws, operating means common to the staple former and the staple driver for moving them simultaneously in a like direction and for imparting a differential movement thereto to make the staple former active in advance of making active the staple driver, and a cam carried on one side of the staple former for shifting on the start of the operation of said former the said actuating means in a direction to move the movable cutter means to coactive relation with respect to the stationary cutter.

13. In a machine for forming and driving staples, a vertically movable assembly formed of a staple former and a staple driver positioned forwardly of the staple former element including a pair of forwardly extending spaced parallel staple forming jaws, said driving element operating between said jaws, and operating means common to the staple former and the staple driver for moving them simultaneously in a like direction and for imparting a differential movement thereto to make the staple former active in advance of making active the staple driver, said staple driver including a resilient coupling element, and said coupling and driving elements having coacting means for detachably connecting said driving element in driving position.

14. In a staple forming and driving machine, a wire feeding mechanism having its front formed with a pair of superposed spaced aligned vertical grooves, a wire conductor anchored in and depending from the lower groove, a supporting structure for said mechanism, an angular element including a horizontal part and a vertical part at the inner side of the horizontal part, said element being anchored to said structure over said mechanism and extending across said upper groove, said horizontal part provided with a vertical opening aligning with the upper groove, said vertical part being formed with an outwardly directed lateral extension disposed above said horizontal part, a tubular wire guide anchored in said opening and depending through the upper groove, an upstanding strap-like member having its lower end seated on the top of said horizontal part and its lower end terminal portion secured to the outer side face of the vertical part, said member being formed throughout its outer side face with spaced superposed aligned combined wire guides and retainers, and an automatically acting spring controlled pivoted wire check carried by said extension and disposed in coacting relation with respect to the outer side face of the lower end terminal portion of said member.

15. In a machine for forming and driving staples, a pivotally suspended anvil element formed transversely with a trough for receiving and supporting a length of wire stock which is to be severed and from which the staple is formed on said element, a shiftable abutment means engageable with said element for arresting the pivoting of the latter in one direction during the forming of the staple, an intermittently operable wire stock cutter mechanism arranged adjacent said element and including means for respectively guiding the said length of stock through the trough and for severing it off adjacent one side of said element, a wire stock feed mechanism including intermittently operable coacting means for intermittently feeding lengths of the wire stock through said cutter mechanism and trough, interengageable vertically movable staple forming and driving mechanisms simultaneously moving in a like direction for acting on the severed length of stock supported by the trough and having a differential movement imparted thereto to make the staple forming mechanism active in advance of the staple driving mechanism, a driven structure providing a common driving means for the said several mechanisms, operating means for said structure, a normally latched releasable means coacting with said structure for controlling the operation of the latter from said operating means, a standard formed at its upper end with a laterally extending support common to said mechanisms, said structure, said operating means and said controlling means, a staple clincher arranged below and spaced from the staple driving mechanism, a supporting member for said clincher positioned below said support, and means for adjustably connecting one end of said member to the standard below the upper end of the latter.

16. In a machine for forming and driving staples a detachable front plate, a vertically movable adjustable hanger structure connected to said front plate, said structure and plate including coacting means for resiliently supporting said structure in suspended relation with respect to the plate, the coacting means of said structure being adjustable, the coacting means of said plate releasably securing the coacting means of said structure in adjusted position, said structure including a hanger member having a bifurcated lower end, an upstanding tiltable anvil element including a body part formed on its top between its vertical median and outer end with an upstanding arm extending into the furcation of and pivotally connected to said member, a resilient abutment arranged in said structure forwardly of said member, disposed in the path of the top of said body part forwardly of said arm and normally bearing on said element, and said arm having its rear side edge formed with a rearwardly directed beveled nose adapted to be normally disposed in the path of a staple driving mechanism.

ARNOLD F. FISCHER.